United States Patent [19]
Clark et al.

[11] Patent Number: 6,023,459
[45] Date of Patent: *Feb. 8, 2000

[54] FREQUENCY ASSIGNMENT IN WIRELESS NETWORKS

[75] Inventors: Timothy Ian James Clark, Sawbridge Worth; George David Smith, Norwich, both of United Kingdom

[73] Assignee: Northern Telecom Limited, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/760,381

[22] Filed: Dec. 4, 1996

[51] Int. Cl.$^7$ .............................. H04Q 7/00; H04Q 7/20
[52] U.S. Cl. ............................... 370/329; 455/447
[58] Field of Search ..................... 370/319, 321, 370/327, 329, 330, 337, 341, 344; 455/450, 452, 453, 464, 509, 513, 447, 449, 62, 63; 701/117, 20

[56] References Cited

U.S. PATENT DOCUMENTS

| | | | |
|---|---|---|---|
| 4,449,247 | 5/1984 | Waschka | 455/9 |
| 5,282,200 | 1/1994 | Dempsey | 370/85.12 |

(List continued on next page.)

FOREIGN PATENT DOCUMENTS

| | | |
|---|---|---|
| 2023053 | 6/1994 | Canada . |
| 0 397 197 | 11/1990 | European Pat. Off. . |
| 0 429 200 | 5/1991 | European Pat. Off. . |
| 42 18 207 | 12/1993 | Germany . |
| 56-152342 | 11/1925 | Japan . |

(List continued on next page.)

OTHER PUBLICATIONS

A Gamst, "Some lower bounds for a class frequency assignment problems, " IEEE Transactions on Vehicular Technology, 31 (1):8–14, Feb. 1986.

A Gamst. A resource assignment technique for FDMA systems. Alta Frequenza, 57 (89–96), 1988.

M Duque–Anton, D Kunz, and B Ruber, "Channel assignment for cellular radio using simulated annealing," IEEE Transactions on Vehicular Technology, 42 (1):14–21, Feb. 1993.

D Kunz, "Channel assignment for cellular radio using neural networks", IEEE Transactions on Vehicular Technology, 40(1):188–193, Feb. 1991.

(List continued on next page.)

*Primary Examiner*—Huy D. Vu
*Assistant Examiner*—Chiho Andrew Lee
*Attorney, Agent, or Firm*—Lee, Mann, Smith, McWilliams, Sweeney & Ohlson

[57] ABSTRACT

The disclosure relates to wireless networks, and particularly a method and apparatus for assigning carrier frequencies to base station antenna sites.

Base stations are represented as a matrix of interconnected nodes and links, the nodes representing carrier frequency sites and the links being dimensioned in accordance with disallowed frequency slots. A first algorithm is used to assign carrier frequencies to the carrier frequency sites in a non-interfering manner resulting in a partial frequency assignment plan. A second algorithm assigns carrier frequencies to the remaining vacant carrier sites in a manner which seeks to minimise the amount of interference. The order in which the carrier sites are assigned carrier frequencies is determined by either a random ordering, an order generated by simulated annealing, or an ordering generated by a genetic algorithm. A quality measure is generated from the resultant frequency plan and is used to modify the order in which the frequencies are assigned to carrier site nodes in subsequent iterations.

17 Claims, 32 Drawing Sheets

U.S. PATENT DOCUMENTS

| | | | |
|---|---|---|---|
| 5,402,414 | 3/1995 | Asai | 370/58.2 |
| 5,404,574 | 4/1995 | Benveniste | 455/33.1 |
| 5,475,868 | 12/1995 | Duque-Anton et al. | 455/452 |
| 5,555,257 | 9/1996 | Dent | 370/329 |
| 5,561,841 | 10/1996 | Markus | 455/450 |
| 5,623,413 | 4/1997 | Matheson et al. | 701/117 |
| 5,737,691 | 4/1998 | Wang et al. | 455/509 |
| 5,740,536 | 4/1998 | Benveniste | 455/447 |
| 5,809,423 | 9/1998 | Benveniste | 455/452 |
| 5,822,698 | 10/1998 | Tang et al. | 455/447 |

FOREIGN PATENT DOCUMENTS

| | | |
|---|---|---|
| 53-28310 | 3/1978 | Japan . |
| 57-25735 | 12/1982 | Japan . |
| 2-86229 | 3/1990 | Japan . |
| 3-182128 | 8/1991 | Japan . |
| 5-37449 | 2/1993 | Japan . |
| 5-183490 | 7/1993 | Japan . |
| 5-268147 | 10/1993 | Japan . |
| 6-77885 | 3/1994 | Japan . |
| 7-274243 | 10/1995 | Japan . |
| 8-340571 | 12/1996 | Japan . |
| 2 292 865 | 3/1996 | United Kingdom . |
| WO 92/22148 | 12/1992 | WIPO . |

OTHER PUBLICATIONS

JJ Hopfield, DW Tank, "Neural computation of decisions in optimisation problems," Biological Cybernetics, 52:141–152, 1985.

D Kunz, "Suboptimal solutions obtained by the Hopfield Tank neural network algorithm," Biological Cybernetics, 65:129–33, 1991.

W K Lai, GG Coghill, "Channel assignment through evolutionary optimization," IEEE Transactions on Vehicular Technology, 45(1), Feb. 1996, pp. 91–95.

V H MacDonald, "Advanced mobile phone service: The cellular concept", The Bell System Technological Journal, 58(1), Jan.1979.

R Mather, J Mattfeldt, "Channel assignment in cellular radio networks, " IEEE Transactions on Vehicular Technology, 42 (4);647–656, Nov. 1993.

C A Morgenstern, "Algorithms for general graph coloring," PhD thesis, University of New Mexico, May 1990.

D E Goldberg, "Genetic Algorithms in Search Optimization & Machine Learning," Addison Wesley, 1989, ISBN 0201157675, pp. 59–87.

890 - 915 MHz uplink (Mobile to Base)

935 - 960 MHzdownlink (Mobile to Base)

| Cell No | C0 | C1 | C2 | C3 | C4 | C5 | C6 | C7 |
|---|---|---|---|---|---|---|---|---|
| Carrier Requirement | 11 | 7 | 3 | 12 | 4 | 8 | 12 | 5 |

Carrier Requirement Data

Fig 18

| Cell No | C0 | C1 | C2 | C3 | C4 | C5 | C6 | C7 |
|---|---|---|---|---|---|---|---|---|
| C0 | 2 | 4 | 4 | 4 | 1 | 4 | 4 | 4 |
| C1 | 4 | 2 | 4 | 1 | 0 | 2 | 2 | 3 |
| C2 | 4 | 4 | 3 | 3 | 1 | 3 | 4 | 3 |
| C3 | 4 | 1 | 3 | 3 | 4 | 3 | 2 | 2 |
| C4 | 1 | 0 | 1 | 4 | 4 | 4 | 2 | 0 |
| C5 | 4 | 2 | 3 | 3 | 4 | 2 | 4 | 1 |
| C6 | 4 | 2 | 4 | 2 | 2 | 4 | 2 | 3 |
| C7 | 4 | 3 | 3 | 2 | 0 | 1 | 3 | 4 |

Fig 19

| Cell No | C0 | C1 | C2 | C3 | C4 | C5 | C6 | C7 |
|---|---|---|---|---|---|---|---|---|
| Constrained Carriers | 1-6 | 1-6 | 1-7 | 50-55 | 54,55 | 60 | 60 | 60-65 |
Disallowed Channel Data
Fig 20
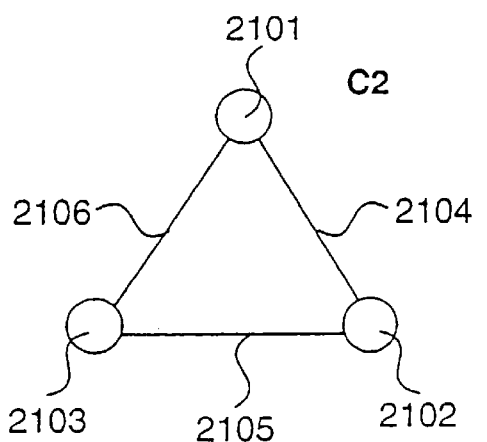
Fig 21
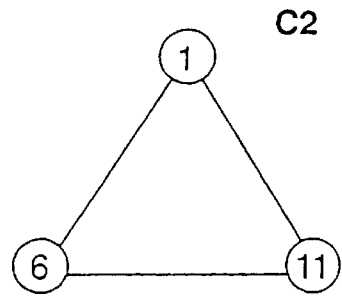
Fig 22

| Cell No. | Available Frequencies | Assigned Frequency | Frequency Demand of Cell |
|---|---|---|---|
| 1 | ABC | A | 1 |
| 2 | A̸BC | C | 2 |
| 3 | A̸B̸C̸ | NONE | 1 |

| Cell | Sector label | Freq. demand | Freq. assigned | | | Cell | Sector label | Freq. demand | Freq. assigned | | |
|---|---|---|---|---|---|---|---|---|---|---|---|
| FT2 | 1 | 3 | 30 | 54 | 56 | FT24 | 3 | 2 | 17 | 35 | - |
| FT2 | 2 | 3 | 43 | 45 | 55 | FT25 | 1 | 2 | 7 | 51 | - |
| FT2 | 3 | 3 | 15 | 58 | 60 | FT25 | 2 | 1 | 9 | - | - |
| FT3 | 1 | 3 | 23 | 18 | 27 | FT25 | 3 | 1 | 33 | - | - |
| FT3 | 2 | 2 | 64 | 56 | - | FT28 | 1 | 3 | 45 | 47 | 57 |
| FT3 | 3 | 3 | 47 | 52 | 57 | FT28 | 2 | 2 | 7 | 28 | - |
| FT4 | 1 | 2 | 1 | 32 | - | FT28 | 3 | 2 | 11 | 41 | - |
| FT4 | 2 | 3 | 7 | 41 | 26 | FT23 | 1 | 1 | 9 | 90 | - |
| FT4 | 3 | 3 | 59 | 10 | 12 | FT23 | 2 | 3 | 59 | - | - |
| FT6 | 1 | 2 | 16 | 18 | - | FT23 | 3 | 3 | 29 | 26 | 32 |
| FT6 | 2 | 3 | 17 | 46 | 26 | FT26 | 1 | 3 | 13 | 15 | 62 |
| FT6 | 3 | 3 | 42 | 62 | 39 | FT26 | 2 | 3 | 49 | 22 | 24 |
| FT9 | 1 | 3 | 3 | 23 | 51 | FT26 | 3 | 3 | 7 | 26 | 32 |
| FT9 | 2 | 3 | 27 | 59 | 9 | FT27 | 1 | 3 | 19 | 61 | 58 |
| FT9 | 3 | 2 | 21 | 62 | - | FT27 | 2 | 2 | 23 | 50 | - |
| FT10 | 1 | 3 | 15 | 59 | 10 | FT27 | 3 | 2 | 57 | 42 | - |
| FT10 | 2 | 3 | 7 | 61 | 16 | FT29 | 1 | 3 | 61 | 34 | 36 |
| FT10 | 3 | 3 | 44 | 50 | 52 | FT29 | 2 | 3 | 47 | 56 | 58 |
| FT11 | 1 | 3 | 47 | 58 | 26 | FT32 | 1 | 3 | 35 | 44 | 56 |
| FT11 | 2 | 2 | 40 | 12 | - | FT32 | 2 | 3 | 9 | 21 | 51 |
| FT11 | 3 | 3 | 3 | 19 | 23 | FT32 | 3 | 3 | 13 | 61 | 58 |
| FT12 | 1 | 3 | 53 | 55 | 10 | FT33 | 1 | 2 | 59 | 50 | - |
| FT12 | 2 | 3 | 35 | 16 | 18 | FT33 | 2 | 2 | 25 | 35 | - |
| FT13 | 1 | 2 | 49 | 32 | - | FT34 | 1 | 3 | 3 | 19 | 54 |
| FT13 | 2 | 3 | 23 | 34 | 36 | FT34 | 2 | 3 | 47 | 24 | 26 |
| FT13 | 3 | 2 | 29 | 46 | - | FT34 | 3 | 3 | 45 | 56 | 34 |
| FT14 | 1 | 3 | 41 | 32 | 25 | FT37 | 1 | 3 | 1 | 44 | 52 |
| FT14 | 2 | 3 | 31 | 6 | 8 | FT37 | 2 | 3 | 15 | 22 | 38 |
| FT14 | 3 | 3 | 33 | 16 | 18 | FT37 | 3 | 3 | 13 | 26 | 58 |
| FT15 | 1 | 3 | 51 | 23 | 27 | FT40 | 1 | 3 | 35 | 18 | 20 |
| FT15 | 2 | 3 | 29 | 1 | 3 | FT40 | 2 | 3 | 43 | 12 | 25 |
| FT15 | 3 | 3 | 27 | 57 | 17 | FT40 | 3 | 3 | 3 | 10 | 7 |
| FT16 | 1 | 3 | 45 | 24 | 11 | FT41 | 1 | 2 | 53 | 48 | - |
| FT16 | 2 | 3 | 3 | 48 | 40 | FT41 | 2 | 3 | 2 | 48 | 54 |
| FT16 | 3 | 3 | 21 | 2 | 4 | FT41 | 3 | 3 | 29 | 38 | 42 |
| FT18 | 1 | 1 | 1 | - | - | FT42 | 1 | 2 | 27 | 39 | - |
| FT18 | 2 | 1 | 40 | - | | FT42 | 2 | 3 | 1 | 15 | 57 |
| FT18 | 3 | 2 | 25 | 27 | - | FT42 | 3 | 3 | 41 | 26 | 32 |
| FT20 | 1 | 3 | 21 | 44 | 52 | FT43 | 1 | 2 | 5 | 58 | - |
| FT20 | 2 | 3 | 5 | 59 | 14 | FT43 | 2 | 2 | 41 | 44 | - |
| FT20 | 3 | 2 | 41 | 47 | - | FT43 | 3 | 2 | 35 | 2 | - |
| FT21 | 1 | 2 | 19 | 47 | - | FT44 | 1 | 3 | 1 | 4 | 6 |
| FT21 | 2 | 2 | 11 | 59 | - | FT44 | 2 | 3 | 45 | 35 | 43 |
| FT21 | 3 | 3 | 13 | 49 | 40 | FT45 | 1 | 1 | 61 | - | - |
| FT22 | 1 | 2 | 3 | 31 | - | FT45 | 2 | 3 | 15 | 1 | 8 |
| FT22 | 2 | 1 | 9 | - | - | FT45 | 3 | 1 | 59 | - | - |
| FT22 | 3 | 1 | 15 | - | - | FT49 | 1 | 1 | 3 | - | - |
| FT24 | 1 | 2 | 33 | 16 | - | FT49 | 2 | 1 | 11 | - | - |
| FT24 | 2 | 3 | 5 | 47 | 55 | FT49 | 3 | 1 | 9 | - | - |
| FT50 | 1 | 2 | 1 | 17 | - | FT77 | 1 | 1 | 31 | - | - |
| FT50 | 2 | 3 | 31 | 6 | 20 | FT77 | 2 | 3 | 57 | 42 | 10 |
| FT50 | 3 | 1 | 21 | - | - | FT77 | 3 | 1 | 15 | - | - |
| FT51 | 1 | 2 | 45 | 62 | - | FT78 | 1 | 2 | 11 | 25 | - |
| FT51 | 2 | 2 | 17 | 50 | - | FT78 | 2 | 3 | 16 | 34 | 36 |
| FT51 | 3 | 3 | 37 | 14 | 16 | FT78 | 3 | 3 | 53 | 30 | 38 |
| FT58 | 1 | 3 | 55 | 20 | 60 | FT79 | 1 | 3 | 41 | 17 | 20 |
| FT58 | 2 | 3 | 52 | 14 | 46 | FT79 | 2 | 3 | 32 | 29 | 35 |
| FT58 | 3 | 2 | 28 | 30 | - | FT79 | 3 | 3 | 1 | 5 | 10 |
| FT59 | 1 | 3 | 31 | 39 | 62 | FT80 | 1 | 3 | 43 | 6 | 8 |
| FT59 | 2 | 3 | 21 | 10 | 16 | FT80 | 2 | 2 | 37 | 48 | - |
| FT59 | 3 | 2 | 23 | 38 | - | FT80 | 3 | 3 | 53 | 61 | 7 |
| FT60 | 1 | 3 | 33 | 18 | 30 | FT82 | 1 | 2 | 15 | 45 | - |

Fig 41(a)

| Cell | Sector label | Freq. demand | Freq. assigned | | | Cell | Sector label | Freq. demand | Freq. assigned | | |
|---|---|---|---|---|---|---|---|---|---|---|---|
| FT60 | 2 | 3 | 25 | 12 | 14 | FT82 | 2 | 3 | 33 | 46 | 48 |
| FT60 | 3 | 3 | 17 | 60 | 20 | FT83 | 1 | 3 | 49 | 4 | 11 |
| FT61 | 1 | 2 | 5 | 29 | - | FT83 | 2 | 3 | 29 | 43 | 20 |
| FT61 | 2 | 1 | 15 | - | - | FT83 | 3 | 3 | 9 | 28 | 30 |
| FT61 | 3 | 3 | 11 | 20 | 22 | FT84 | 1 | 3 | 2 | 4 | 6 |
| FT63 | 1 | 3 | 8 | 10 | 12 | FT84 | 2 | 2 | 37 | 8 | - |
| FT63 | 2 | 3 | 41 | 38 | 44 | FT84 | 3 | 3 | 39 | 18 | 44 |
| FT63 | 3 | 2 | 40 | 55 | - | FT85 | 1 | 3 | 13 | 33 | 60 |
| FT64 | 1 | 1 | 51 | - | - | FT85 | 2 | 3 | 56 | 59 | 2 |
| FT64 | 2 | 2 | 11 | 19 | - | FT87 | 1 | 3 | 7 | 28 | 30 |
| FT64 | 3 | 2 | 1 | 52 | - | FT87 | 2 | 3 | 13 | 17 | 39 |
| FT65 | 1 | 1 | 3 | - | - | FT87 | 3 | 3 | 9 | 5 | 44 |
| FT65 | 2 | 3 | 56 | 40 | 41 | FT88 | 1 | 3 | 25 | 28 | 30 |
| FT65 | 3 | 1 | 27 | - | - | FT88 | 2 | 1 | 23 | - | - |
| FT67 | 1 | 3 | 25 | 43 | 14 | FT88 | 3 | 2 | 5 | 10 | - |
| FT67 | 2 | 2 | 19 | 53 | - | FT89 | 1 | 1 | 15 | - | - |
| FT67 | 3 | 1 | 13 | - | - | FT89 | 2 | 2 | 51 | 4 | - |
| FT68 | 1 | 3 | 49 | 22 | 24 | FT89 | 3 | 2 | 53 | 40 | - |
| FT68 | 2 | 2 | 25 | 54 | - | FT90 | 1 | 3 | 39 | 20 | 42 |
| FT70 | 1 | 3 | 19 | 50 | 52 | FT90 | 2 | 3 | 55 | 58 | 60 |
| FT70 | 2 | 3 | 14 | 22 | 24 | FT90 | 3 | 3 | 27 | 34 | 36 |
| FT70 | 3 | 3 | 37 | 21 | 62 | FT91 | 1 | 3 | 38 | 44 | 62 |
| FT71 | 1 | 2 | 11 | 16 | - | FT91 | 2 | 3 | 17 | 26 | 32 |
| FT71 | 2 | 2 | 47 | 10 | - | FT91 | 3 | 3 | 21 | 46 | 48 |
| FT71 | 3 | 3 | 9 | 4 | 6 | FT92 | 1 | 2 | 37 | 60 | - |
| FT72 | 1 | 2 | 14 | 2 | - | FT92 | 2 | 2 | 57 | 8 | - |
| FT72 | 2 | 3 | 36 | 37 | 13 | FT92 | 3 | 2 | 3 | 14 | - |
| FT72 | 3 | 2 | 7 | 42 | - | FT96 | 1 | 2 | 35 | 8 | - |
| FT73 | 1 | 3 | 5 | 19 | 30 | FT96 | 2 | 1 | 51 | - | - |
| FT73 | 2 | 3 | 9 | 49 | 28 | FT96 | 3 | 2 | 45 | 12 | - |
| FT73 | 3 | 2 | 37 | 54 | - | FT97 | 1 | 2 | 15 | 55 | - |
| FT74 | 1 | 3 | 13 | 9 | 43 | FT97 | 2 | 1 | 5 | - | - |
| FT74 | 2 | 3 | 17 | 26 | 32 | FT97 | 3 | 1 | 23 | - | - |
| FT74 | 3 | 3 | 29 | 39 | 3 | FT98 | 1 | 3 | 11 | 2 | 4 |
| FT76 | 1 | 2 | 29 | 53 | - | FT98 | 2 | 3 | 19 | 54 | 9 |
| FT76 | 2 | 3 | 11 | 37 | 2 | FT98 | 3 | 3 | 55 | 58 | 60 |
| FT100 | 1 | 3 | 57 | 38 | 40 | n8 | 1 | 1 | 57 | - | - |
| FT100 | 2 | 3 | 11 | 2 | 4 | n8 | 2 | 2 | 21 | 43 | - |
| FT100 | 3 | 2 | 43 | 50 | - | n8 | 3 | 2 | 31 | 34 | - |
| FT101 | 1 | 2 | 31 | 6 | - | n9 | 1 | 2 | 1 | 12 | - |
| FT101 | 2 | 2 | 33 | 20 | - | n9 | 2 | 3 | 45 | 22 | 24 |
| FT101 | 3 | 1 | 5 | - | - | n9 | 3 | 3 | 7 | 13 | 28 |
| FT103 | 1 | 1 | 55 | - | - | n100 | 1 | 3 | 5 | 34 | 36 |
| FT103 | 2 | 2 | 25 | 56 | - | n100 | 2 | 3 | 16 | 28 | 30 |
| FT103 | 3 | 3 | 57 | 16 | 18 | n4b | 1 | 1 | 13 | - | - |
| FT104 | 1 | 3 | 61 | 50 | 52 | n4b | 2 | 3 | 29 | 37 | 55 |
| FT104 | 2 | 3 | 31 | 6 | 62 | n4b | 3 | 1 | 21 | - | - |
| FT104 | 3 | 3 | 55 | 34 | 60 | n4a | 1 | 2 | 43 | 10 | - |
| FT105 | 1 | 3 | 38 | 40 | 33 | n4a | 2 | 3 | 31 | 22 | 24 |
| FT105 | 2 | 2 | 49 | 25 | - | n4a | 3 | 2 | 27 | 55 | - |
| FT105 | 3 | 3 | 39 | 8 | 22 | n4c | 1 | 2 | 5 | 49 | - |
| n1 | 1 | 2 | 1 | 17 | - | n4c | 2 | 2 | 1 | 9 | - |
| n1 | 2 | 1 | 39 | - | - | n11 | 1 | 2 | 21 | 49 | - |
| n1 | 3 | 1 | 45 | - | - | n11 | 2 | 3 | 31 | 38 | 50 |
| n2 | 1 | 2 | 3 | 35 | - | n11 | 3 | 2 | 33 | 48 | - |
| n2 | 2 | 2 | 13 | 18 | - | n101 | 1 | 3 | 61 | 20 | 22 |
| n2 | 3 | 1 | 19 | - | - | n101 | 2 | 2 | 39 | 47 | - |
| n3 | 1 | 2 | 1 | 15 | - | n101 | 3 | 2 | 9 | 28 | - |
| n3 | 2 | 2 | 21 | 49 | - | n102 | 1 | 3 | 35 | 2 | 4 |
| n5 | 1 | 3 | 31 | 62 | 6 | n102 | 2 | 3 | 7 | 42 | 56 |
| n5 | 2 | 3 | 53 | 10 | 30 | n102 | 3 | 3 | 46 | 48 | 54 |
| n5 | 3 | 3 | 43 | 51 | 61 | n103 | 1 | 3 | 3 | 6 | 8 |

Fig 41(b)

| Cell | Sector label | Freq. demand | Freq. assigned | | | Cell | Sector label | Freq. demand | Freq. assigned | | |
|---|---|---|---|---|---|---|---|---|---|---|---|
| n6 | 1 | 3 | 13 | 27 | 37 | n103 | 2 | 3 | 19 | 38 | 40 |
| n6 | 2 | 3 | 19 | 2 | 4 | n103 | 3 | 3 | 39 | 24 | 42 |
| n6 | 3 | 1 | 15 | - | - | n104 | 1 | 3 | 41 | 8 | 22 |
| n7 | 1 | 2 | 13 | 23 | - | n104 | 2 | 3 | 13 | 53 | 28 |
| n7 | 2 | 2 | 11 | 29 | - | n104 | 3 | 3 | 5 | 24 | 17 |
| n7 | 3 | 2 | 3 | 51 | - | | | | | | |

Fig 41(c)

FREQUENCY ASSIGNMENT IN WIRELESS NETWORKS

FIELD OF INVENTION

The present invention relates to wireless networks, and particularly although not exclusively to a frequency assignment method for assigning frequencies to transmitter/receiver stations in a cellular wireless network.

INTRODUCTION

A conventional cellular wireless network as shown schematically in FIG. 1 herein comprises a plurality of mobile stations 1, for example mobile phones, car phones, mobile fax machines, and a plurality of geographically separated radio transmitter/receiver base stations 2, connected through mobile network switching apparatus to the public switched telephone network (PSTN) 3. The mobile stations 1 move around a geographical area within radio transmission range of the base stations 2, and transmit to and receive communications calls from the base stations.

In the design of a cellular wireless network, design engineers are faced with a multitude of design constraints. As the cost of acquiring and maintaining a transmitter/receiver site for a base station is significant in relation to the cost of a base station transmitter/receiver communications apparatus, one object of cellular network design is to provide coverage for a geographical area using the minimum number of base stations. For a given geographical area, ideally a network would require only one base station to carry all communications traffic in the area. However, this is not feasible for two main reasons. Firstly, the radio transmission range is limited by the maximum transmission power of mobile stations, and by noise. This fundamental constraint imposes a maximum spacing between adjacent base stations to ensure full coverage of the area. Secondly, in order to satisfy an expected level of communications traffic, sufficient communication channels must be available to carry the traffic, but the available frequency band width is limited. For example in the known global system for mobiles system operating at 900 MHz (GSM 900 system), a 25 MHz frequency band is available. In the GSM system, a full rate speech communications channel supporting simultaneous conversation, requires a channel band width of 25 kHz. The available frequency band width spectrum is divided into a plurality of carrier frequencies, separated from each other in frequency space such as not to interfere with each other. There are limits to the number of carrier frequencies which can be accommodated in an available frequency band width spectrum, used by an individual transmitter/receiver base station and this limits the communications traffic carrying capacity of the base station.

It is known to use various mechanisms to increase the channel carrying capacity of individual channel frequencies within a frequency band spectrum. For example, transmission time is multiplexed by time division multiple access (TDMA) enabling each carrier frequency to support a number of different communication channels, for example six. Further, a channel may hop frequency, to use an unoccupied carrier frequency. A GSM transmission channel comprises a series of bursts of about a 100 modulated bits of information having a finite duration and occupying a finite part of the radio spectrum. In this manner, a channel occupies a set of disparate time and frequency windows. For example, in the GSM system frequency windows are positioned every 200 kHz within a system frequency band. Nevertheless, although multiplexing in the time and frequency domains allows efficient usage of the carrier frequencies within the frequency band, because of the limited transmission range of the mobile stations and the need for increased traffic capacity, particularly in densely populated areas, it is still necessary to cover a geographical area using a plurality of transmitter/receiver base stations all operating within the same frequency band spectrum. It is necessary to re-use carrier frequencies in between different transmitter/receiver sites to achieve required channel capacity.

Conventionally, each transmitter/receiver base station site is thought of as covering a"cell", being an area in which a mobile station will communicate with the transmitter/receiver. If two adjacent base stations in adjacent cells are operating on the same carrier frequency at the same time, there is a likelihood of interference between communications of the two adjacent base stations. It is therefore necessary to ensure as far as possible that this situation does not occur.

The problem of assigning carrier frequencies to base stations in a non-interfering manner, is known as the frequency assignment problem (FAP). When the frequency assignment problem is extended to include the assignment of channels to carrier frequencies, this is known as the channel assignment problem (CAP).

It is known to produce as a solution to the frequency assignment problem, a frequency assignment plan, which specifies which carrier frequencies are assigned to which transmitter/receiver site. A significant amount of effort goes into producing a conventional frequency assignment plan, and various prior methods of generating such a plan will now be described.

Referring to FIG. 2 herein, there is shown a conventional representation of geographical wireless coverage areas covering a geographical area as a layout of a plurality of hexagonal cells. At the centre of each cell is a transmitter/receiver base station having an omnidirectional antenna for transmitting and receiving radio signals omnidirectionally from the centre of the cell. The distance from the edge of the cell to the centre of the cell represents the estimated range of transmission of the radio signals from a mobile station. In order for communications with the transmitter/receiver base station in central cell 20, operating at carrier frequency A to be free of interference at the boundaries of the cell 20, reuse of the centre frequency A in cells 21–26 adjacent to cell 20 is impermissable. The arrangement of FIG. 2 avoids first order interference between adjacent cells using the same centre frequency, by ensuring that there is always an intermediate cell 21–26 which does not use carrier frequency A, surrounding the cell 20. Cells 27–32 which are spaced apart from cell 20 by at least one other cell can reuse the carrier frequency A.

Referring to FIG. 3 herein, in order to avoid second order interference, between a centre cell 300 operating at a carrier frequency A and adjacent cells, base stations within two cells distance from the centre cell 300 cannot reuse the same carrier frequency A.

In a conventional simple hexagonal cell model as shown in FIG. 4 herein, carrier frequencies f1, f2, f3, f4, f5, f6, f7 are assigned to base stations at the centres of hexagonal cell. In this frequency assignment scheme, cells using the same carrier frequency are separated by two other cells in between. For example cell 401 is separated from cell 402 by intervening cells 403, 404. Similarly, cells 404 and 405 each using the same carrier frequency f6, are separated by intervening cells 401, 403, 406 and 407 operating at non-interfering different carrier frequencies.

In order to increase the capacity of the cellular wireless network, it is known to assign more than one carrier frequency to each base station, resulting in separate carrier frequencies transmitting and receiving simultaneously within the same cell. As the number of carrier frequencies per cell increases, assignment of carrier frequencies to surrounding cells in a manner which avoids or minimises interference becomes an involved task.

In GB 2 292 865, there is disclosed a cellular wireless network in which the capacity of the network is increased by using directional antennas and in which carrier frequencies are assigned to base site clusters using a cyclical assignment algorithm., Frequency assignment methods for assigning carrier frequencies to directional antennas at centres of hexagonal cells are also disclosed in European patent EP 0 429 200.

In WO 92\22148, there is disclosed an RF wireless telecommunications system using either directional or omni-directional antennas in which carder frequencies are assigned in a basic set of 16 square cells, and in which co-channel interference is reduced by use of directional antennas.

The above known methods of frequency assignment assume that radio coverage in an area can be approximated using simple hexagonal or square cell geometries. In reality, the radio coverage patterns around a base station are complex, and the known frequency assignments using hexagonal or square theories do not provide suitable solutions to the frequency planning problems arising in real world systems. In practice, as illustrated in FIG. 5 herein, a plurality of transmitter/receiver base stations may provide radio coverage for a geographical area which is mountainous or undulating, the coverage being provided in a patchwork manner. A first base station 501 may have a range of communication with a mobile station extending to a surrounding boundary 502. The boundary 502 of the transmitter may extend beyond another boundary 503 of an adjacent transmitter 504, as well as extending beyond boundaries 505, 506 of further respective adjacent base stations 507, 508. There may be specific areas, for example area 509 which are in range of up to four base stations. A mobile station within such an area may receive communications from four transmitters, and four base stations receivers may detect transmissions from the mobile station in area 509. It will be seen from FIG. 5 that even approximating the coverage areas around a base station by a set of abutting polygons of complex shape as shown, although more realistic than a conventional hexagonal or square cell representation, is still an approximation to the real situation. Further, the positions of the boundaries around the base stations are not necessarily fixed, but may vary from day to day depending upon atmospheric conditions. The practical variations in parameters which any model for assignment of frequencies to a spatial representation of wireless coverage areas around base stations must cope with include the following:

In practice, base station sites do not necessarily belong to a regular grid, as optimum sites from the transmission/reception point of view may be uneconomic to purchase, or the network operator may be unable to secure ownership or rental of the site;

The terrain may not be flat but may be undulating, mountainous, or include an urban or city environment;

Propagation conditions are usually very irregular, and therefore interference levels between adjacent cells do not depend solely on distance;

Spatial variations in traffic density lead to a channel demand which varies from cell to cell;

Environmental constraints impose limits on the usability of certain frequencies.

Due to the large number of variable parameters in a real wireless network, computation of every possible combination of frequency assignments under all possible circumstances of variable parameter in order to find the optimum frequency assignments solution is an N-P complete problem, and is impossible. This means that an algorithm solving the frequency assignment problem exactly for arbitrary input parameters, i.e. an algorithm which always finds the frequency plan which uses the minimum number of frequencies will in general not terminate in polynomial time because the number of computational operations required to obtain the optimal solution cannot be bounded by a polynomial in the length of the input parameter data. On the other hand, to find a feasible frequency plan with minimum frequency demand (the frequency assignment problem, FAP) is possible, but is NP-hard.

Several attempts have been made by prior workers to provide workable frequency assignment plans which take into account some of the above practical variable parameters, and which can be found approximately in a reasonable amount of time, and a significant research and development effort is being applied to find the optimum solutions to the frequency assignment problem.

Graph theory has been used to set bounds upon the frequency assignment problem. This enables a description of a planning problem to be evaluated so that a bound can be set upon the number of carrier frequencies required to generate an interference free assignment. Iterative algorithms can be designed that use these bounds to design frequency plans. Gamst[4,5] realised the limitations of hexagonal pattern theory and applied a frequency assignment algorithm which was inspired by a graph colouring approach. The algorithm relied on finding a lower bound on the frequency demand (i.e. the number of carrier frequencies required) for each channel and assigned individual frequencies, reusing frequencies from cell to cell as necessary to obtain a frequency plan with a smallest overall frequency demand. It was found that where there was a marked difference in the minimum frequency demand between adjacent cells in a locality, the quality of frequency assignment plan solutions converged to a final solution relatively rapidly. In more than 95% of cases an optimized solution was found in less than 100 iterate cycles, and over 95% of cases converged to an optimized solution within 1000 cycles of the algorithm. However, where minimum frequency demands from cell to cell were relatively evenly distributed with adjacent cells having comparable minimum frequency demands, the time taken by the algorithm to converge to an optimized solution was unreasonably large, and in the case of an homogenous hexagonal cell system having constant channel demand per cell, the algorithm usually failed to find regular frequency reuse structures.

Antón and Kunz[8] identified drawbacks with graph colouring schemes used in conjunction with regular hexagon geometrical schemes. Drawbacks of graph colouring methods include:

1 Graph theoretic approaches require hard interference decisions indicating whether the same carrier frequency by two radio cells is allowed or not. However, there is a high amount of uncertainty whether interference will occur, and a hard decision on interference does not allow for the significant amount of uncertainty as to whether two radio cells will interfere.

2 The graph colouring schemes allow no prioritization of which constraints to violate in the case where a channel assignment plan fulfilling all constraints can not be found. Thus, the colouring scheme may produce a solution fulfilling low priority criteria, whilst leaving higher priority criteria unfulfilled.

3 Graph theoretical approaches aim for minimization of the used frequency spectrum. In practice, the assigned band width may be greater than the minimum frequency spectrum required by a graph theoretical approach solution to the frequency assignment problem, and the graph theoretical approach does not allow for usage of the complete assigned band width to provide a more optimum overall solution including, for example, reserving some channels to provide for future network growth.

However, using the conventional graph theories and iterative algorithms, the lower bound of the number of required carrier frequencies will often be much larger than the number of available carrier frequencies. Network designers usually have no control over the available number of carrier frequencies.

Kunz[7] applied the neural network approach of Hopfield and Tank[8] to the frequency assignment problem, but found this approach to be inappropriate, yielding bad solutions even in simple cases, and favouring sub-optimal carrier frequency assignments[9]. Antón and Kunz[6] subsequently went on to apply a simulated annealing technique to the frequency assignment problem. They formulated the frequency assignment problem by defining a search space in terms of a radio network of n cells each capable of carrying m carrier frequencies to create a search space of possible solutions comprising a binary matrix of dimension m×n. In this way, the simulated annealing technique was applied directly to a solution of the problem. For a seven cell cluster, computing times of 3 to 5 hours were recorded. For an inhomogenous network having 239 cells and 38 carrier frequency groups, computing times of 44 to 65 hours were recorded to obtain optimized solutions. Antón and Kunz noted that a serious problem with the inhomogenous networks was that the simulated annealing technique became trapped by an overwhelming number of local minima in the search. Once the technique was trapped in a poor minimum of the search space, the chance of randomly escaping the minimum was low.

Lai and Coghill[10] sought to improve on the graph colouring methods and simulated annealing method by using the alternative technique of genetic algorithms. An initial population of possible solutions were generated, in the form of strings of channel numbers representing carrier frequencies, and with the position of the carrier frequency in the string representing the cell to which the carrier frequency is assigned. The strings were selectively evolved by reproducing and mutation from generation to generation, until optimized solution strings emerged from the population. The optimized solution strings represented optimized solutions to the frequency assignment problem. The technique was reported to have found a useable solution for an assignment of 75 carrier frequencies to a network of 25 cells.

The above algorithms and techniques all seek to find to find workable solutions to the frequency assignment problem within manageable time and ideally aim to find an optimum solution to the frequency assignment problem. The algorithms and techniques have varying degrees of success. Direct comparison of the reported techniques is difficult because of the differences in the way the frequency assignment problem is formulated in each case, because of the subjective nature of measuring the quality of solutions obtained to reported examples of assignment problems, and because of the different examples of problem scenarios reported.

As mobile wireless networks increase in size and complexity in response to increased traffic demand, the computational size of the frequency assignment problem increases and the computational processing requirements for implementing conventional methods of approaching the frequency assignment problem also increase. Although the increased computational demand is partially offset by improvements in processing power as new generations of computer processor emerge, since the frequency assignment problem is N-P complete in its fullest form, increases in computational processing power can never match the processing requirements for a rigorous treatment of the problem.

There exists a continuing need for methods and apparatus for implementing the efficient assignment of frequencies to base stations of mobile wireless networks.

REFERENCES

1) G B 2 292 865
2) E P 0 429 200
3) W O 92/221 48
4) Andreas Gamst. Some lower bounds for a class of frequency assignment problems. *IEEE Transactions on Vehicular Technology*, 35(1):8–14, February 1986.
5) Andreas Gamst. A resource assignment technique for FDMA systems. *Alta Frequenza*, 57(89–96),1988.
6) Manuel Duque- Antón, Dietmar Kunz, and Bernhard R über. Channel assignment for cellular radio using simulated annealing. *IEEE Transactions on Vehicular Technology*, 42(1):14–21, February 1993.
7) Dietmar Kunz. Channel assignment for cellular radio using neural networks. *IEEE Transactions on Vehicular Technology*, 40(1):188–193, February 1991.
8) J. J. Hopfield and D. W. Tank. Neural computation of decisions in optimisation problems. *Biological Cybernetics*, 52: 141–152, 1985.
9) Dietmar Kunz. Suboptimal solutions obtained by the Hopfield Tank neural network algorithm. *Biological Cybemetics*, 65: 129–133, 1991.
10) W. K. Lai and George G. Coghill. Channel assignment through evolutionary optimisation. *IEEE Transactions on Vehicular Technology*, 45(1), February 1996.
11) V. H. MacDonald. Advanced mobile phone service: The cellular concept. *The Bell System Technological Journal*, 58(1), January 1979.
12) Rudolf Mathar and Jürgen Mattfeldt. Channel assignment in cellular radio networks. *IEEE Transactions on Vehicular Technology*, 42(4):647–656, November 1993
13) Craig Allen Morgenstem. *Algorithms for general graph coloring*. PhD thesis, The University of New Mexico, May 1990.
14) David E Goldberg. *Genetic Algorithms in Search Optimization and Machine Learning*. Addison Wesley, 1989, ISBN 0201 157675

SUMMARY OF THE INVENTION

According to a first aspect of the present invention, there is provided a method for assigning a set of communications frequencies to a plurality of network elements, each operating at least one frequency, the method comprising the steps of:

representing each said network element as a corresponding respective set of at least one frequency site node;

linking said plurality of frequency site nodes together by a plurality of dimensioned links, each said dimensioned link representing a constraint on the assignment of a communications frequency to at least one said node;

determining an order in which to assign said plurality of communications frequencies to said plurality of nodes; and assigning said communications frequencies to said nodes in said determined order.

Preferably each said dimensioned link represents a frequency slot spacing between at least a pair of carrier frequencies.

Preferably, said step of assigning communications frequencies comprises:

for each node of the plurality, where possible assigning a frequency which does not interfere with frequencies assigned to other nodes; and for each node for which a non interfering frequency cannot be assigned, assigning to said node a frequency which causes a minimum interference with frequencies assigned to other said nodes.

During said step of assigning a non-interfering frequency said nodes may be selected in a first order, and during said step of assigning a minimally interfering frequency, said nodes may be selected in a second order.

Preferably, said step of assigning comprises:

selecting a node according to a said order;

selecting a frequency which is substantially free of interference from frequencies assigned to other linked nodes linked to said selected node; and assigning said selected frequency to said selected node.

Preferably said method further comprises the steps of;

evaluating a result of said substantially interference free assigned frequencies; and producing a quality measure representing a quality of said substantially interference free assignment.

Preferably, said step of assigning comprises;

selecting a node according to a said order;

selecting a frequency which is minimally interfering with frequencies assigned to other nodes linked to said selected node; and assigning said selected minimally interfering frequency to said selected node.

Preferably, said method further comprises the steps of;

evaluating a result of said assignment of minimally interfering frequency to said selected node; and producing a quality measure determined from a level of interference produced by said assignment of minimally interfering frequency.

Said step of assigning may comprise:

maintaining a table of node data and frequency data in which each said node has listed a corresponding set of available frequencies and a corresponding set of linked nodes;

selecting a node in accordance with said order;

revising said table on assignment of a said frequency to a selected node by deleting said assigned frequency from said set of available frequencies corresponding to said selected node; and deleting said assigned frequency from said sets of available frequencies corresponding to other nodes of the plurality each of which are linked to the selected node.

Said step of determining an order may comprise modifying said order in response to a quality measure determined as a result of said assignment of frequencies.

According to a second aspect of the present invention there is provided a method for assigning a plurality of communications frequencies to a communications network comprising a plurality of network elements, the method comprising the steps of:

representing said communications network as a matrix of a plurality of node data and a plurality of dimensioned link data, in which each said network element is represented by a corresponding respective set of said node data, and said dimensioned link data represents a set of constraints on the assignment of communications frequencies to said plurality of node data;

representing said set of communications frequencies as a set of frequency data;

determining an order data representing an order in which to assign said set of frequencies to said nodes;

assigning said frequency data representing said set of frequencies to said node data representing said nodes in an interference free manner across said whole matrix until no more interference free assignments can be made;

assigning said frequency data to said node data representing any remaining vacant node in a way which causes minimum interference; and generating a quality measure data of the assignment.

The process preferably further comprises the step of modifying said order data in response to said quality measure data.

Said step of determining an order data may comprise applying a simulated annealing algorithm to generate an ordering of node data.

Said step of determining an order data may comprise generating an order of node data by a genetic algorithm.

Said step of determining an order data may comprise generating a random ordering of node data.

According to a third aspect of the present invention there is provided the data processing apparatus for processing data describing a plurality of communications frequencies and data describing a plurality of network elements comprising a communications network, the apparatus comprising a processor and a memory configured into the following elements;

an interference matrix data generating means for generating an interference matrix data in which each said network element is represented by a corresponding respective plurality of nodes, each representing a frequency site, said nodes being linked by a plurality of links, each said link representing a dimensioned constraint on an assignment of at least one frequency to at least one said node;

an order generating means for generating an order data specifying an order in which to assign said frequencies to said nodes;

a frequency assignment data generating means for generating a frequency assignment plan data specifying an assignment of frequencies to said nodes; and an evaluation data generating means for evaluating said assignment plan data and producing an evaluation data describing a quality of said assignment plan data, wherein said order data generating means operates to receive said evaluation data and create a new order data in response to said evaluation data; and said frequency assignment data generating means operates to generate a new assignment plan data in response to said new order data.

Preferably, said new order data comprises a modification of said order data.

An apparatus for assigning a plurality of frequencies to a plurality of network elements comprising a communications network, said apparatus comprising:

an interference matrix generation means for generating an interference matrix in which each said network element is represented by a corresponding plurality of nodes, each said node representing a carrier site, said nodes being linked by a plurality of links, each said link representing a dimensioned constraint on an assignment of at least one frequency to at least one said node;

an ordering means for determining an order in which to assign said frequencies to said network elements;

an assignment means for assigning said plurality of frequencies to said plurality of network elements in an order specified by said ordering means; and an evaluation means for evaluating a result of said assignment of frequencies and for generating an evaluation data signal in accordance with said result.

According to a fourth aspect of the present invention there is provided a machine readable medium containing control signals for causing a data processing apparatus to function as an apparatus to assign a plurality of frequencies to a plurality of nodes representing network elements, comprising a communications network, said control signals configuring said data processing apparatus into the following elements:

an interference matrix generation engine for generating an interference matrix data in which each said network element is represented by a corresponding plurality of nodes, each representing a frequency site, said nodes being linked by a plurality of links, each said link representing a dimensioned constraint on an assignment of at least one frequency to at least one said node;

an order generating engine for generating an order data specifying an order in which to assign said frequencies to said nodes;

a frequency assignment engine for assigning frequency data describing an assignment of said frequencies to said nodes; and an evaluation engine for evaluating a result of said frequencies to nodes, and for producing a quality data in response to said evaluation.

BRIEF DESCRIPTION OF THE DRAWINGS

FIGS. 18 to 20 illustrate structures of data processed by the operations and management centre apparatus;

FIGS. 21 to 23 illustrate a layout of data representing a communications network, as processed by the operations and management centre apparatus;

FIGS. 41a to 41c illustrate a print out of data of a frequency assignment plan for a communications network;

BEST MODE FOR CARRYING OUT THE INVENTION

The best mode for carrying out the invention will now be described by way of example only with reference to the accompanying drawings identified above.

The best mode herein is described with reference to a GSM 900 MHz or GSM 1800 MHz wireless network, but the methods and process described are equally applicable to other frequency ranges, for example the PCS 1900 wireless system as used in the United States of America Referring to FIG. 6 herein, there is shown an example of a wireless radio network comprising eight base transceiver stations (BTS) 600–607 providing coverage over eight cellular areas C0–C7, for communication with a plurality of mobile stations 609. In a network which complies with the known Global System for Mobile Communications standards, originating from the Groupe Spécial Mobile (GSM) assembly of the Conference Européanne des Postes et Télécommunications (CEPT) standardisation arena, a base transceiver station comprises radio transmission and receiver devices including an antenna and all signal processing apparatus specific to the radio transmitter/receiver. Typically, a base transceiver station consists of a few racks of equipment containing all electronic apparatus for the transmission of the radio signals and can be considered as a complex radio modem. The antenna is usually situated a few tens of metres away from the base transceiver station on a mast, and the racks of equipment are connected to it by a feeder cable. Typically, a first generation single rack base transceiver station is able to handle 3 to 5 radio carrier frequencies. Since communication channels are assigned to carrier frequencies in time division multiplexed manner, the first generation base transceiver station may carry between 20 and 40 simultaneous communications. Subsequent generations of base transceiver station carry significantly more channels.

Figure 7:
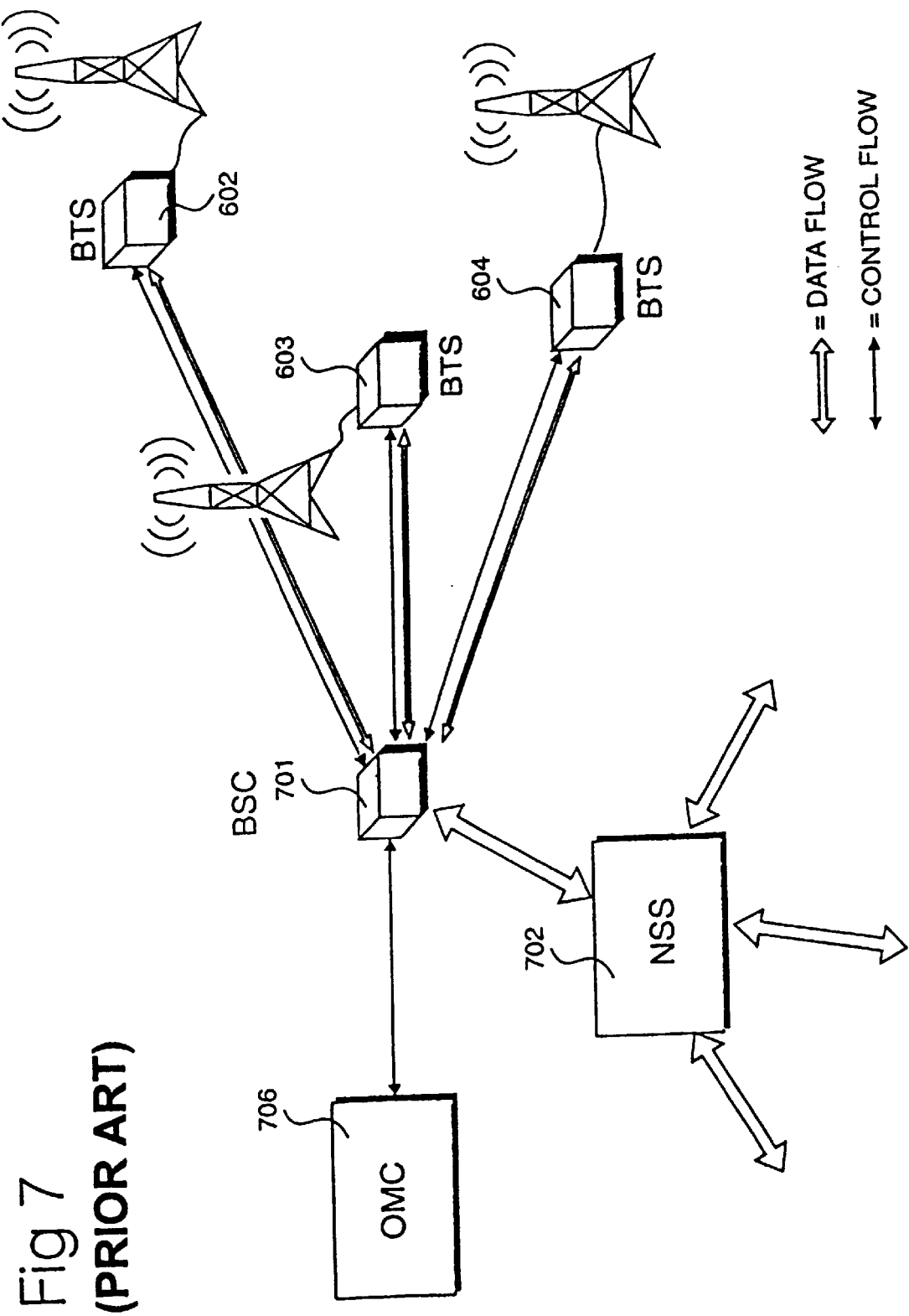
FIG. 7 illustrates network apparatus for controlling frequency assignment to a set of base transceiver stations.

Referring to FIG. 7 herein, radio interference between adjacent base transceiver stations 602–604 is managed through remote command of the base transceiver stations and remote command of a mobile station communicating with the base transceiver stations by a base station controller apparatus 701. Which is connected to several of the base transceiver stations. The base station controller comprises a small switch having a substantial computational capability. Its main function is the management of channels and hand over of communications between stations. Typically a conventional base station controller consists of one or two racks of equipment and can manage up to 10 or more base transceiver stations, depending on the traffic capacity of each base transceiver station. The base station controller and its associated base transceiver stations comprise a base station sub-system (BSS). The base station sub-system communicates with a network and switching sub-station (NSS) 702, which co-ordinates the setting up of calls to and from GSM mobile station users across the network. The network and switching sub-station comprises a mobile services switching centre (MSC). The basic switching function of the network and switching sub-station is performed by the mobile services switching centre whose main function is to co-ordinate the set up of calls to and from GSM users. The mobile services switching centre has interfaces with a number of base station sub-systems on one side, and with external networks on another side. Typically a mobile services switching centre may control a few base stations, and is usually a large switching machine which may occupy around 6×2 m high cabinets. A typical mobile services switching centre may serve a regional capital city and its surroundings, totalling of the order of 1 million inhabitants.

Connected to one or more base station controllers 701 is an operation and management centre 706. The operation and management centre is capable of implementing a frequency assignment plan and of automatically assigning carrier frequencies to each of the base transceiver stations, by sending instructions on the configuration of the base transceiver stations to the base station controllers, which implement the assignment of frequencies to each of the base transceiver stations to which they are connected.

Figure 8:
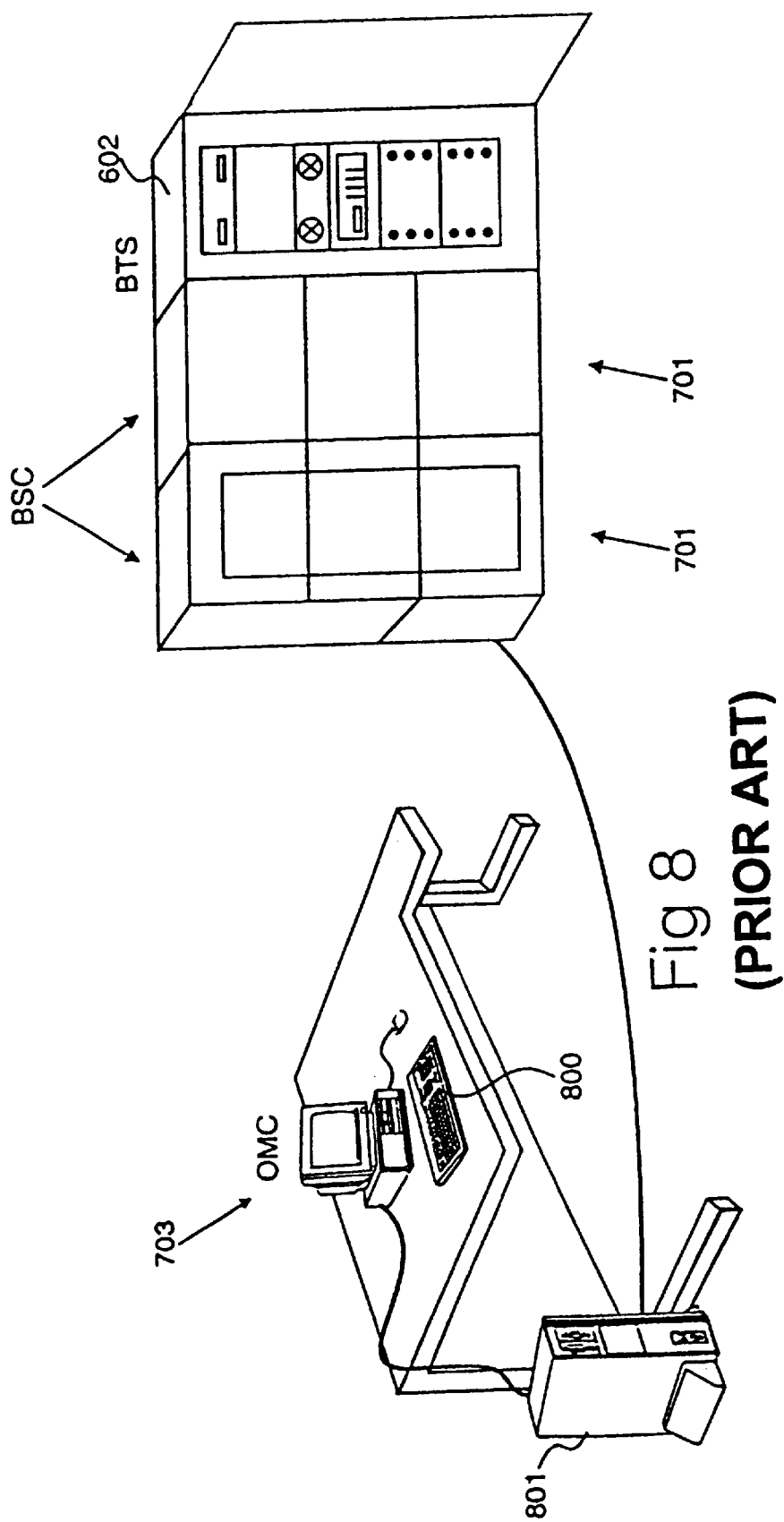
FIG. 8 illustrates an operation and management centre apparatus for controlling frequency assignment to the base transceiver stations.

Referring to FIG. 8 herein, there is shown one embodiment of an operation and management centre 703 linked to a base station controller 701 which in turn controls the plurality of base transceiver stations, of which one is shown in FIG. 8. Typically, the operation and management centre 703 comprises a computer work station having a user interface 800 including a monitor, keyboard and pointing device, and a processor 801. For example, the work station may comprise a Hewlett Packard HP9000 workstation having 64 Mbytes of memory, however a number of known Intel Pentium processor based workstations or personal computers may perform equally well as an operation and management centre. Assignment of the carrier frequencies is only one of the functions of the operation and management centre 703. The function of the assignment of frequencies to base stations sits within a larger structure of functionality of the GSM network as a whole.

The operation and maintenance centre (OMC) is a term used to describe the operation network as seen by a particular traffic handling machine, e.g. a base transceiver station or base station controller. A frequency assignment plan in the form of frequency assignment plan data generated by the workstation 703 is transmitted to the base station controller, which implements the changes in frequency by issuing control instructions for the change of carrier frequencies in each base transceiver station to which it is connected.

The base transceiver stations 600–607 each comprise a plurality of radio frequency amplifiers and a coupling device. The amplifiers feed a coupling device which combines the output of the radio frequency amplifiers to feed a radio frequency signal to a single antenna of each base transceiver station. At a practical hardware level, changing the carrier frequencies transmitted and received by an antenna involves tuning the coupling device between the set of amplifiers and the antenna of the base transceiver station. Since the operation frequency spectrum bandwidth of the transceiver is centred around either 900 or 1800 MHz, signals of these frequencies can not simply be added by connecting or disconnecting wires. Two major techniques for coupling exist. Firstly, a conventional hybrid coupling device having an advantage that it does not require special tuning depending on the emitted frequency may be used. Using the hybrid coupling device, changing the carrier frequency remotely does not raise any problem. The carrier frequencies emitted by the amplifiers can be remotely tuned electronically and the hybrid coupling device couples the different frequencies for transmission and reception from a single antenna.

Although remote changing of the carrier frequency does not raise any problem, the hybrid coupling devices introduce power losses proportional to the number of combined carrier frequencies, and hybrid coupling is typically unacceptable for more than four carrier frequencies combined on a single antenna. Hybrid coupling technology is better suited to low density traffic conditions than high density traffic conditions.

Secondly, another conventional coupling technique known as cavity coupling makes use of tuned filters between the output of each amplifier and a common point connected to all the amplifiers. The tuned filters prevent the energy generated by other amplifiers at different carrier frequencies feeding back into any one amplifier. However, a drawback of tuned filters (cavity couplers) is that frequency tuning involves moving mechanical parts. Cavity tuners can be remotely tuned, since the moving mechanical parts are controlled by small electric motors. In this case, practical implementation of a frequency plan involves converting data signals representing carrier frequencies into specific control signals controlling individual motors of the tuned filter in order to implement the change of carrier frequencies at the base transceiver stations.

In older conventional cavity systems which are not motorised, control involves manually adjusting the filters with a screwdriver. In such cases, implementation of a frequency plan would involve an engineer reading a written printout of frequency plan data describing carrier frequencies assigned to the base station, and manually tuning the filters to change the transmitted carrier frequencies.

A frequency assignment plan for a network has an important impact on the traffic capacity of the network as a whole, and is difficult to optimise for full scale operation of a network, as indicated in the introduction of this document. Further, both long and short term changes to the network occur during operation of the network. Removal or addition of a base transceiver station causes removal or addition of a cell and will affect the overall optimum frequency assignment plan for the modified network. Addition or removal of base stations may occur due to short-term reliability problems, or due to expansion and development of the network over a longer period. Also, traffic capacity requirements placed upon the network may vary over relatively short time scales, for example daily, or from week to week. The possibility of changing the frequency assignment plan with minimum disruption to services and in a short time period, gives a commercial advantage to a network operator, especially if no on site action is required and the frequency plan can be implemented remotely.

Figure 9:
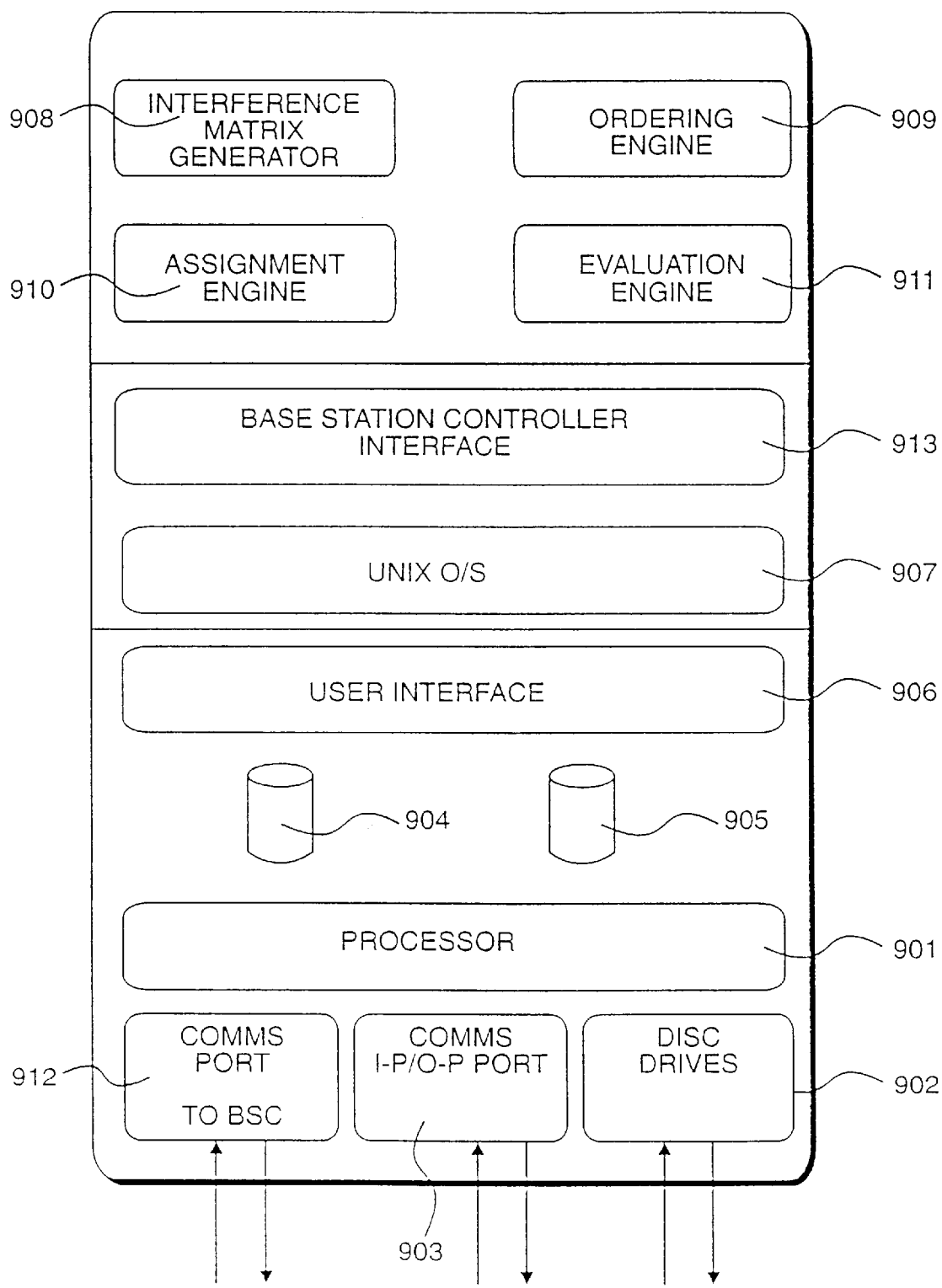
FIG. 9 illustrates an architecture of the operation and management centre apparatus.

Referring to FIG. 9 herein, there is shown an architecture of the operation and management centre apparatus 703. The apparatus comprises a processor 901 for processing input data signals relating to the network, the data may be stored on data carriers for example floppy discs and input to the apparatus via a disk drive 902, or alternatively the data may be input directly from for example a lap top computer, and downloaded into the apparatus 703 via a communications port 903. The apparatus comprises one or more databases 904, 905 for storing processed data signals, and a user interface 906 comprising a video monitor, keyboard, pointing device and optionally a printer. The apparatus operates in accordance with a UNIX operating system 907. Input data signals are processed by control signals arranged as a set of application programs stored in memory. The control signals may be transferred into the memory from a storage medium such as a cassette tape, compact disc, a set of floppy discs, or can be downloaded form a hard drive of a laptop computer, or transferred via a cable from another computer. The control signals comprise a set of signals which configure the operation and management centre apparatus into elements of an interference matrix generator 908 for generating an interference matrix data from the input data signals; an ordering engine 908 for generating an ordering data which specifies in which order carrier frequency numbers are to be assigned to a generated interference matrix data; an assignment engine 910 for assigning carrier frequencies to the interference matrix data generated by the interference matrix generator and an evaluation engine 911 for evaluating the results of the assignment of frequencies to the interference matrix data and generating an evaluation data which is input to the ordering engine 909. A frequency assignment plan data results from operation of the processor 901 operating under control of the interference matrix generator, ordering engine, assignment engine and evaluation engine applications. The frequency assignment plan data may be transmitted to one or more base station controllers through communications port 912 operating in accordance with a base station controller interface instruction set 913. The base station controller interface 913 may operate to transmit frequency assignment plan data to one or more base station controllers in accordance with a known protocol, for example as used in the Hewlett Packard Open View Tool Set. The frequency assignment plan data specifies which frequencies are assigned to which base transceiver stations. The base station controller is responsible for receiving the frequency assignment plan data and determining from that data a control data which it transmits to each of the base station transceivers. The base station transceiver receive the control data and convert the control data to control signals which actuate the electric motors of the couplers and implement re-tuning of the couplers and amplifiers to effect actual change in carrier frequencies transmitted and received.

Figure 10:
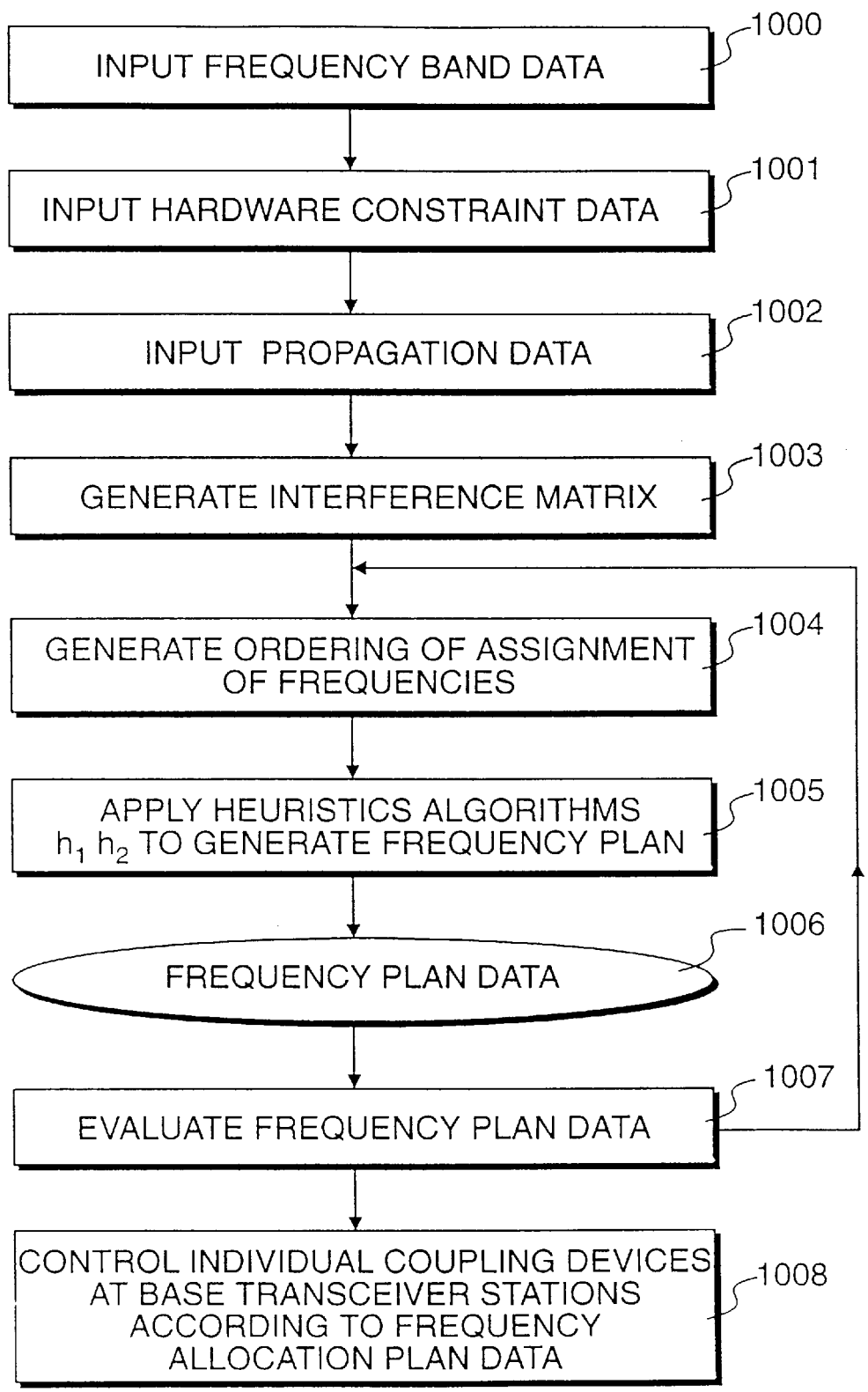
FIG. 10 illustrates a process for assignment of frequencies to the base transceiver stations.

Referring to FIG. 10 herein, there is shown an overview of a process for frequency assignment in a wireless network using the apparatus described with reference to FIGS. 6–9, in FIG. 11 herein there is shown a functional hardware arrangement of the operation and management centre for implementing stages of the process, and in FIG. 12 there is shown a data flow diagram illustrating processing of data by the operation and management centre. Processing of the propagation data and carrier frequency data is implemented by the operation and management centre apparatus as follows.

The frequency planning process starts with an estimated traffic demand, a limited portion of the radio spectrum and a geographical region over which the network must operate. Base stations are then located across the region and a propagation model is generated. In step 1000 a frequency band data 1200, containing details of available carrier frequencies, is input to the operation and management centre 703. In step 1001, a hardware constraint data 1202 concerning the limitations on available carrier frequencies determined by the type of hardware technology used, and the constraints on range and carrier frequency spacings imposed by the hardware is input into the operation and management centre. In step 1002, a propagation model data 1202 describing propagation characteristics of the geographical area served by the network and including details of any disallowed frequencies at specific sites due to poor propagation or local interference problems, and specifying the number of carrier frequencies to be assigned to each base station transceiver, is input into the operation and management centre 703. The operation and management centre processes the propagation model data, hardware constraint data and frequency band data by firstly generating an interference matrix data in step 1003 summarising the propagation model data and hardware constraint data in matrix format, and then generating an ordering data in step 1004 specifying an order in which to assign frequencies to the interference matrix data, and in step 1005 applying first and second heuristic algorithms h1, h2 to assign the frequencies to the matrix, and generating a frequency plan data 1006 in which carrier frequencies are allocated to each of the base stations in the network. In step 1008, the frequency plan data is used to tune the carrier frequencies at the base transceiver stations 600–607, by tuning the amplifiers and coupling devices at each base transceiver station as mentioned above.

Figure 11:
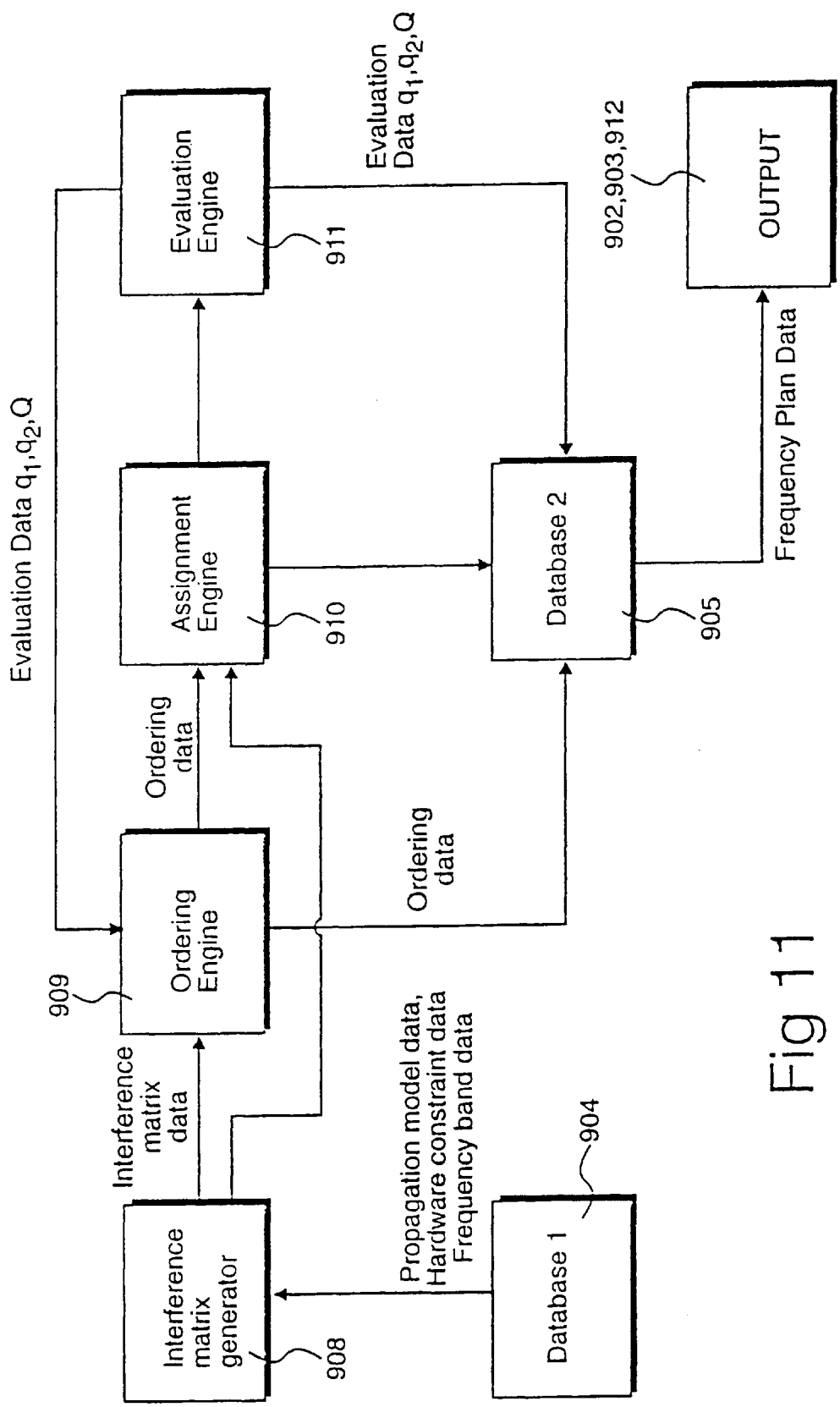
FIG. 11 illustrates a functional hardware overview for implementing data processing in the operation and management centre apparatus.
Figure 12:
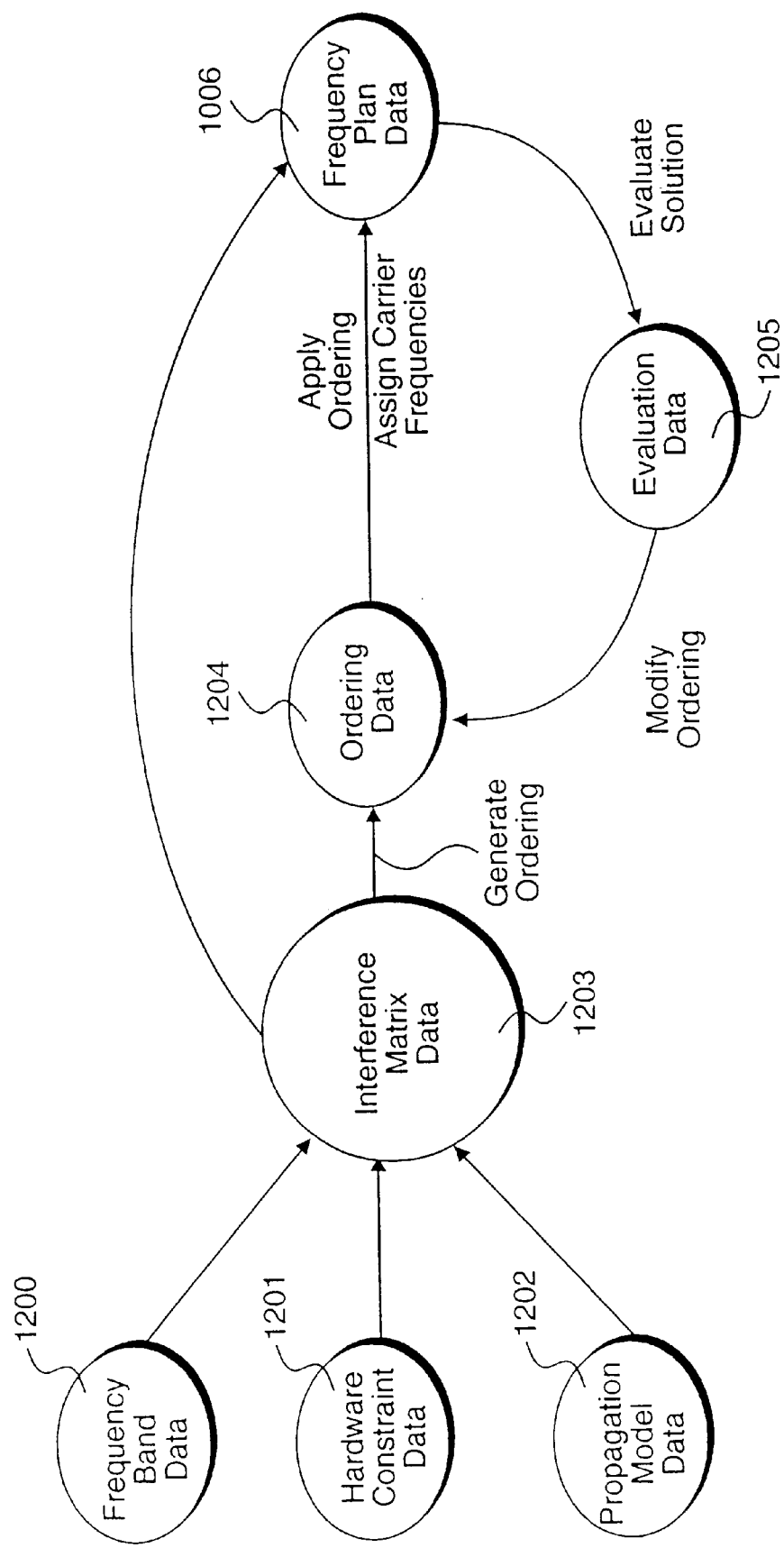
FIG. 12 illustrates a flow of data as processed by the operation and management centre apparatus.

Referring to FIGS. 11 and 12 the frequency band data 1200, hardware constraint data 1201, and propagation model data 1202 are stored in database 904 and input into the interference matrix generator 908 which produces interference matrix data 1203. The interference matrix data comprises a matrix of carrier frequency sites represented as nodes, connected by dimensioned links representing constraints on assignment of carrier frequencies to the nodes. The interference matrix data 1203 is input into the ordering engine 909 which generates an ordering data 1204. The ordering data 1204 is input into the assignment engine 910 which assigns carrier frequencies to the carrier frequency sites in the interference matrix in an order specified by the ordering data. The assignment engine outputs a frequency plan data in which carrier frequencies are assigned to carrier frequency sites in the interference matrix data. The frequency plan data comprises a list of base transceiver carrier frequency sites grouped into individual antenna groupings, each base carrier frequency site being assigned a carrier frequency data. During assignment of carrier frequencies to carrier frequency sites, the evaluation engine 911 generates evaluation data representing a measure of the level of optimisation of the assignment of carrier frequencies to the carrier frequency sites of the interference matrix data 1203, and consequently a measure of quality of the frequency plan data 1007. The evaluation data 1205 is fed back to the ordering engine 909 which uses the evaluation data to generate new ordering data for input to the assignment engine 910 for creating a new frequency plan data.

Figure 13:
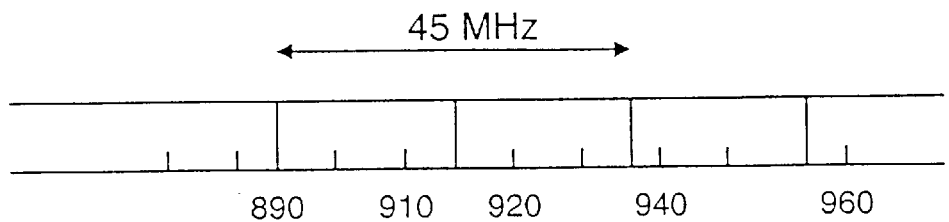
FIG. 13 illustrates an available frequency band for wireless network communications.

In step 1000, frequency band data describing the available carrier frequencies is input. The exact carrier frequencies available need to be negotiated with regulatory authorities that assign an available frequency spectrum in which the carrier frequencies reside. In the GSM specifications, two available frequency bands are a first band centred around 900 MHz and a second band centred around 1800 MHz. In the first band two sub-bands of 25 MHz each in the range 890–915 MHz, and 935–960 MHz are available, and in the second band, a further two sub-bands each of 75 MHz in the frequency range 1710–1785 MHz and 1805–1880 MHz are available. For example in the lower sub-band 890–915 MHz, this sub-band is used an up-link from a mobile stations to base stations. The 900 MHz upper sub-band 935–960 MHz is used for the down link from the base stations to the mobile stations. These frequency sub-bands are represented schematically in FIG. 13 herein.

Figure 14:
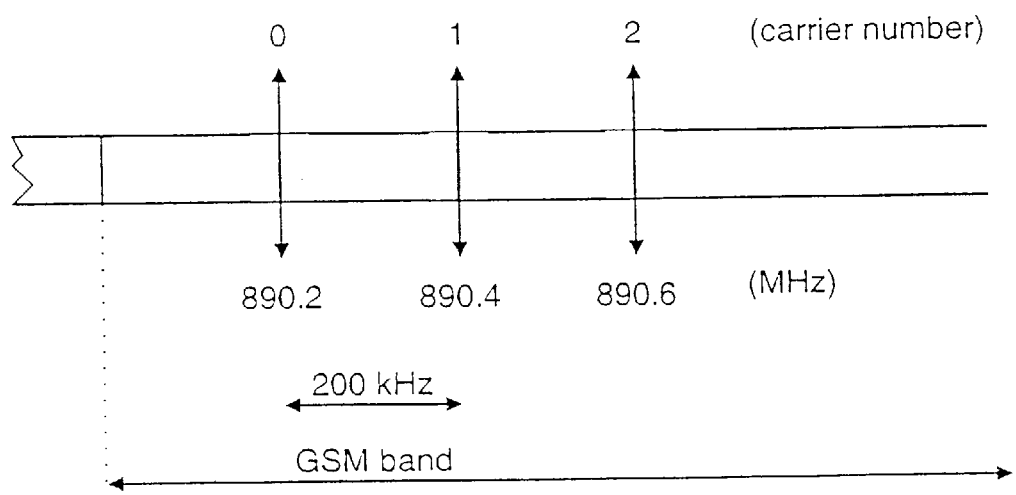
FIG. 14 illustrates a layout of carrier frequencies in the frequency band of FIG. 13.

Referring to FIG. 14 herein, within each sub-band, specific centre frequencies of carrier frequencies are separated from each other by a slot spacing of 200 kHz. Since the carrier frequencies are not discrete single frequencies but spread over a frequency range across the frequency sub-band, side bands of one carrier frequency may interfere moderately with side bands of a directly adjacent nearest neighbour carrier frequency. It is preferred in the assignment of carrier frequencies to base stations to avoid assigning carrier frequencies of two directly neighbouring frequency slots to a single antenna, and to avoid assigning the same carrier frequency to two directly adjacent cells, or two cells spaced apart by an intervening cell.

Each carrier frequency is assigned a carrier number 0, 1, 2. . . In the case of the 890–915 MHz sub-band there are defined 124 different carrier frequency slots extending over a band width of 25 MHz. In practice, since the two peripheral frequency slots peripheral to the sub-band are often not used, to avoid interference with users of other equipment near the band borders the available number of frequency slots is limited to 122. The carrier frequency numbers in the upper 900 MHz sub-band, in the range 935–960 MHz, are numbered 125–248 and again the peripheral carrier frequencies at the band borders are often not used.

In the 1800 MHz range sub-bands the up link and down link sub-bands each consist of 374 carrier frequencies.

Each carrier frequency may carry up to six communications channels, time division multi-plexed. Further, a single channel may hop from one carrier frequency to another over time. The frequency assignment problem is to assign the carrier frequencies to the base stations, such that each base station uses enough carrier frequencies simultaneously to satisfy the communications traffic demand from mobile station users from within the coverage area of the base station without there being interference between carrier frequencies at the same base station (intra-cell interference), and without there being interference between the carrier frequencies used by one base station and other base stations in directly adjacent cells, or cells spaced apart by only one intervening cell (inter-cell interference).

Typically, the frequency band data will comprise a list of carrier frequencies in a frequency band, each assigned a carrier number.

The spacing of useable carrier frequencies within the frequency spectrum is limited by the electronics technology of the base station and mobile station apparatus, particularly the amplifier antennas and couplings. These limitations comprise the hardware constraint data 1201. These minimum frequency spacing between carrier frequencies comprises a frequency constraint on the assignment of carrier frequencies to base stations.

The Hardware Constraint Data Specifies (a) the minimum carrier frequency spacing between carrier frequencies occupying the same transceiver necessary to avoid intra-cell interference between other carrier frequencies operating on the same transceiver (otherwise referred to as co-site interference); and (b) the minimum carrier frequency spacing between each carrier frequency of one cell, and the carrier frequencies of immediately adjacent cells, to avoid interference between adjacent cells (first order interference).

(c) the minimum carrier frequency spacing between each carrier frequency of one cell and each carrier frequency of a next but one neighbour cell to avoid interference (referred to as second order interference).

Figure 15:
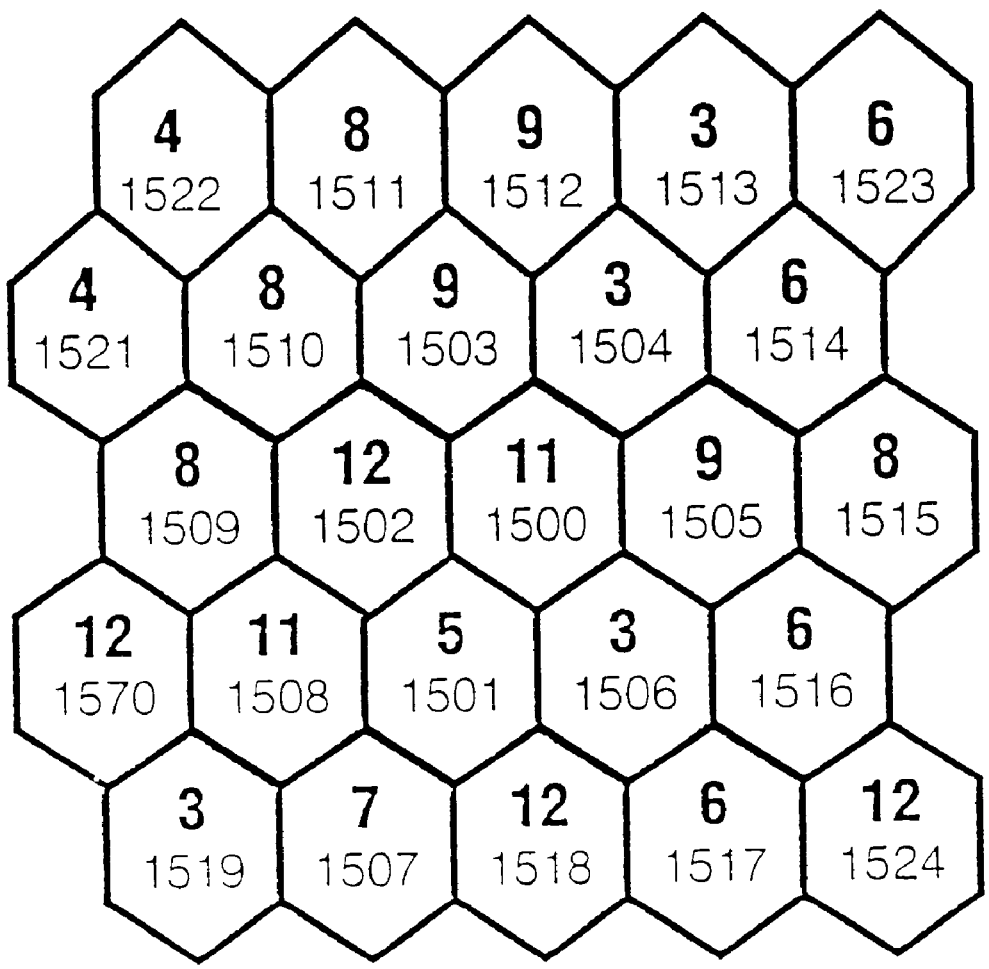
FIGS. 15 to 17 illustrate rules for allocating carrier frequencies in a cellular communications network, in a manner which minimises interference.
Figure 16:
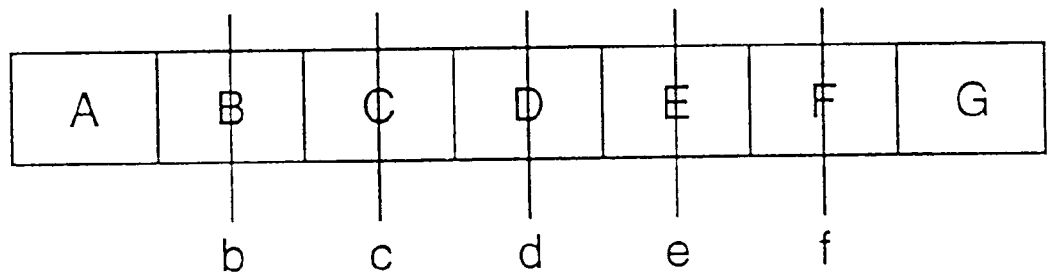

Referring to FIGS. 15 and 16, an example of a rule to be applied to avoid intra-cell (co-site) interference within cell 1500, and for avoiding first order inter-cell interference between cell 1500 and immediately adjacent neighbouring cells 1501 and 1506, and for avoiding second order inter-cell interference between cell 1500 and next-but-one nearest neighbour cells 1507–1518 is illustrated.

For example cell 1500 may operate a carrier frequency d MHz centred around a 200 kHz slot D as shown in FIG. 16. A rule on assignment of further frequencies to the same cell 1500 may specify that cell 1500 can not reuse the same carrier frequency d, nor can it use carrier frequencies c, e centred around adjacent frequency slots C, E, or next but one carrier frequencies b, f centred in next-but-one adjacent frequency slots B, F.

A rule for assignment of carrier frequencies to adjacent cells 1501–1506 specifies that to avoid first order inter-cell interference, immediately adjacent cells 1501–1506 can not reuse the carrier frequency d, and can not use carrier frequencies in immediately adjacent frequency slots C , E. However, next but one adjacent frequency slots B, F may be used in the adjacent cells 1501–1506.

To avoid second order interference, next-but-one neighbouring cells 1507–1518 can not reuse the same carrier frequency, but can use frequencies c, e centred in immediately adjacent frequency slots C, E. Cells 1519–1524, which are spaced apart from cell 1500 by at least two intervening cells may reuse the carrier frequency d centred in the carrier frequency slot D.

Figure 17:
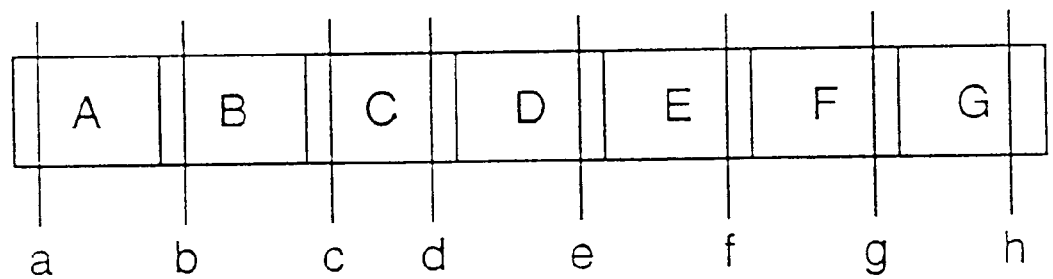

The rules for frequency reuse specify allowed and disallowed frequency slots in the frequency domain. Where carrier frequencies are equally spaced within the frequency domain, for example at 200 kHz centres, the above rules are directly applicable, replacing carrier number for slot. However, where, as shown in FIG. 17, carrier frequencies are irregularly spaced in frequency space, avoidance of first order inter-cell interference may preclude the use of more than two immediately adjacent carrier frequencies as these may reside in a same slot, and similarly for avoidance of co-site interference (intra-cell interference) and second order inter-cell interference.

The propagation model data results from power and frequency readings taken across the whole geographical domain over which the network is to provide coverage. These measurements are taken in the field by engineers. The propagation model data may also include a data model of the terrain of the domain. The propagation model may specify preferred sites within the domain for the positioning of base transceiver stations and may include the geographical positions of existing base transceiver stations. The propagation model is input as a set of electronic data signals stored on a data carrying medium, for example a ROM or floppy disk, or can be downloaded directly from a laptop computer or other measuring instrument.

The propagation model data may comprise a list of base stations, and a list of carrier frequency numbers which are (I) allowed and (II) disallowed for assignment to that base station. The propagation model may also include a geographical map data in electronic format which can be converted by the user interface of the operation and management centre apparatus to display a geographical map plan of the domain to be covered by the wireless network. The propagation model data may list each base station in table format along with immediately adjacent base stations, data concerning the number of frequencies to be assigned to that base station to fulfil the traffic demand, a list of specific carrier frequencies which are disallowed at that base station due to poor propagation characteristics or other constraints, e.g. technological or regulatory.

Referring to FIGS. to 18 to 20, there are shown arrangements of the data in the propagation model data.

Figure 1:
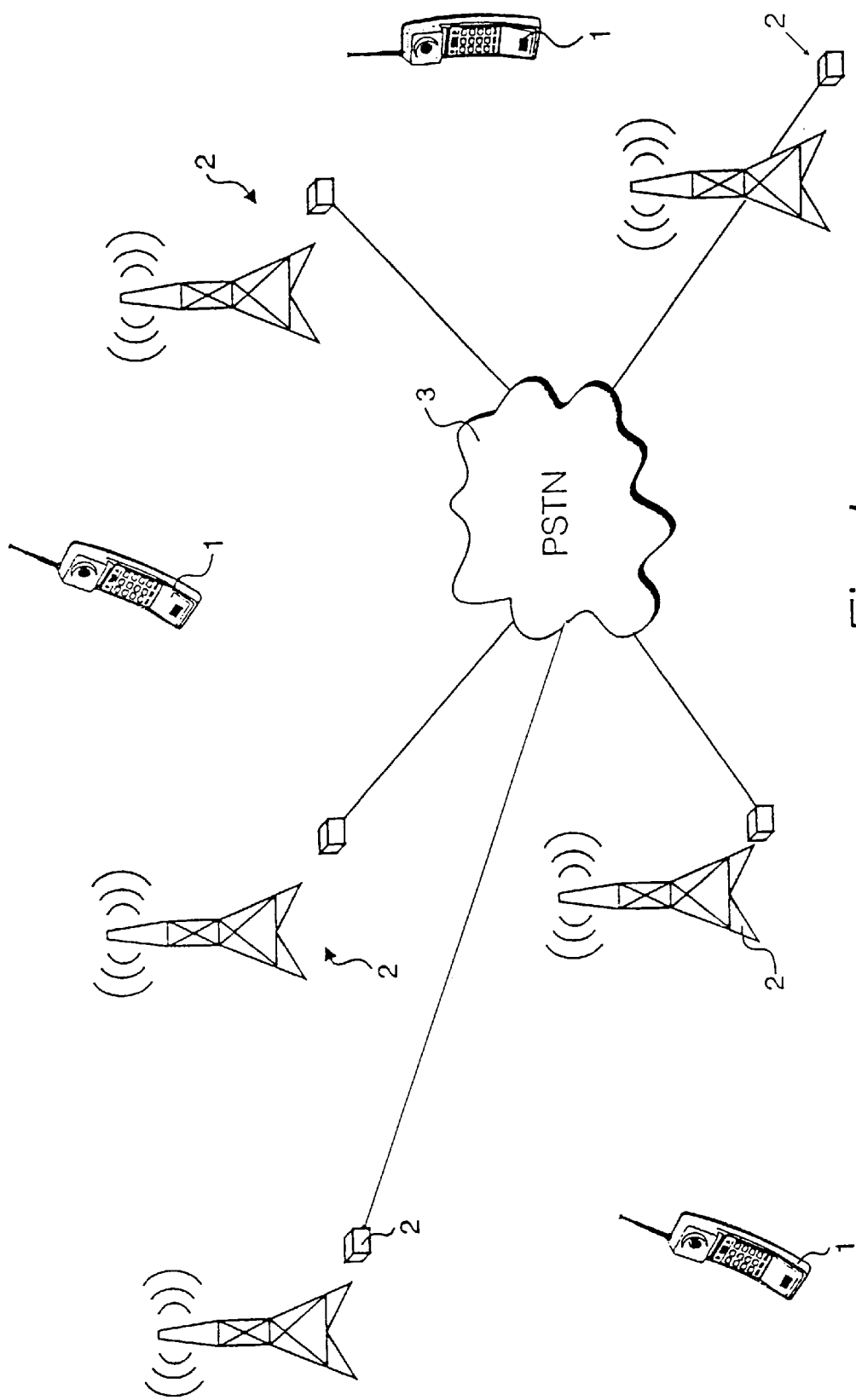
FIG. 1 illustrates a conventional cellular wireless network.
Figure 2:
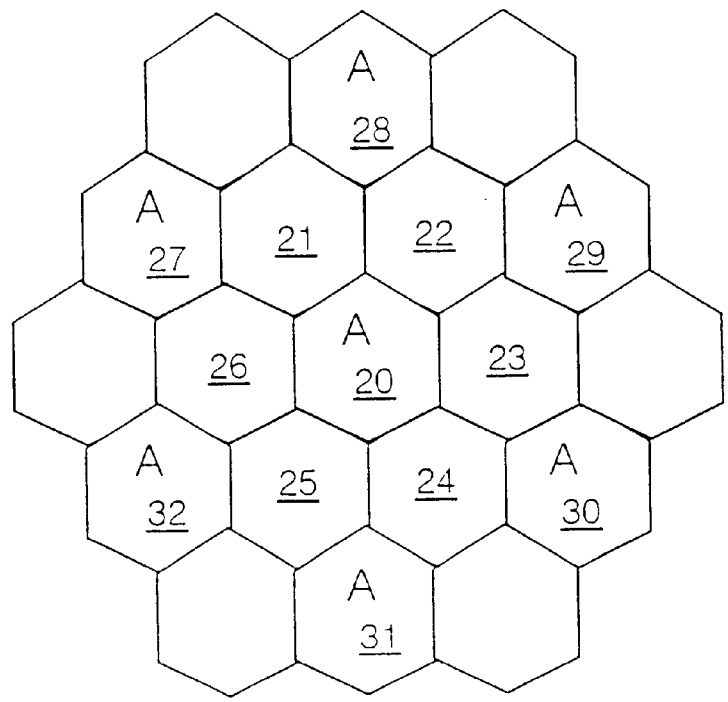
FIG. 2 illustrates a conventional geographical wireless coverage areas in a layout of a plurality of hexagonal cells.
Figure 3:
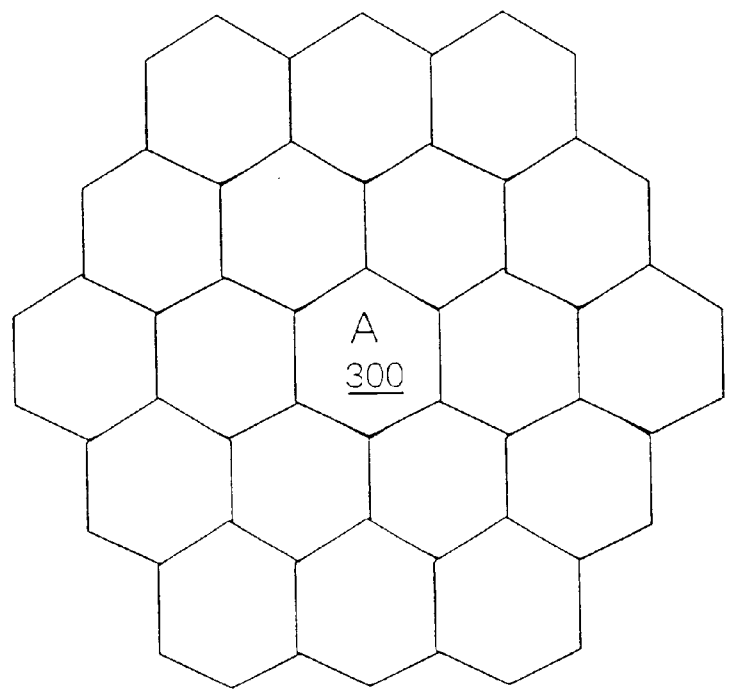
FIG. 3 illustrates a center cell of different carrier frequency in geographical wireless coverage areas.
Figure 4:
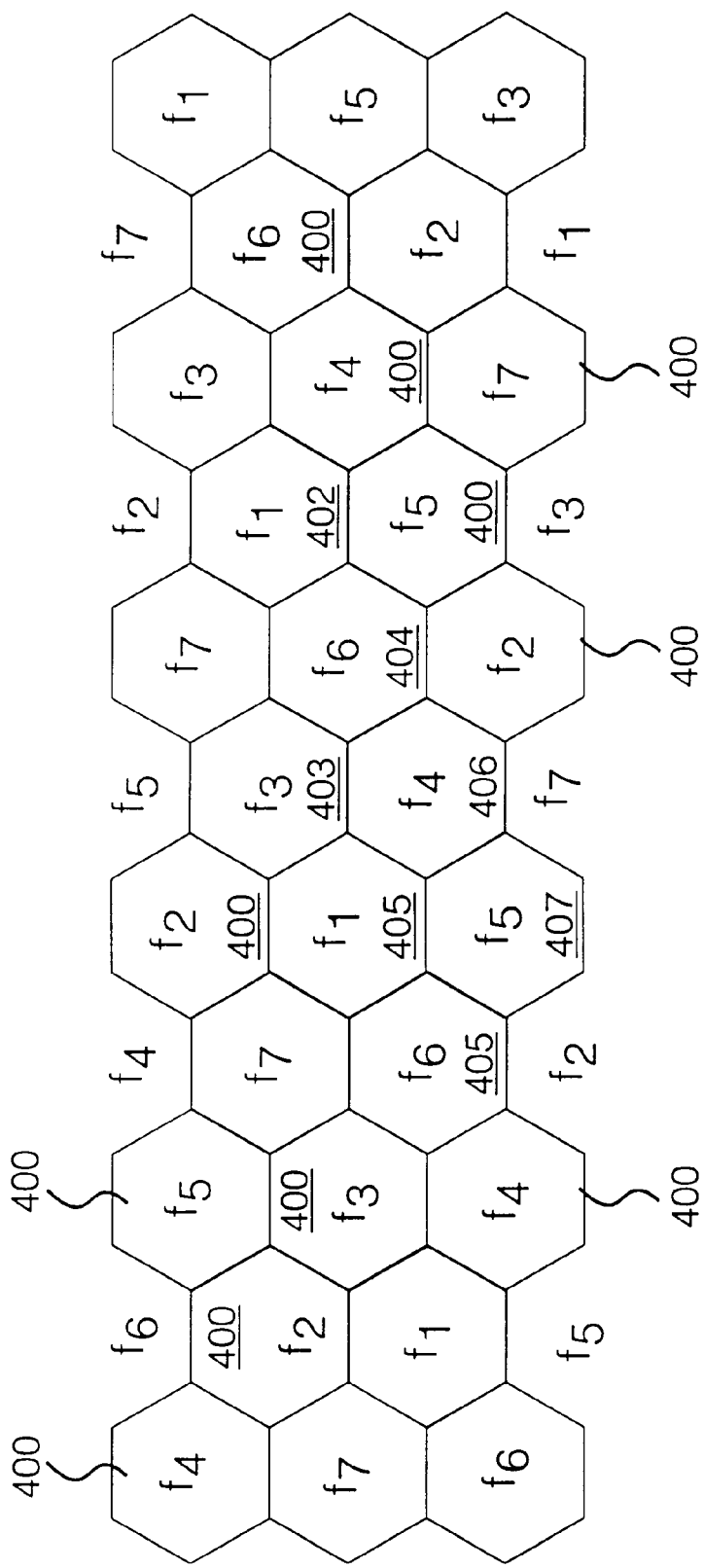
FIG. 4 illustrates a conventional hexagonal cell model.
Figure 5:
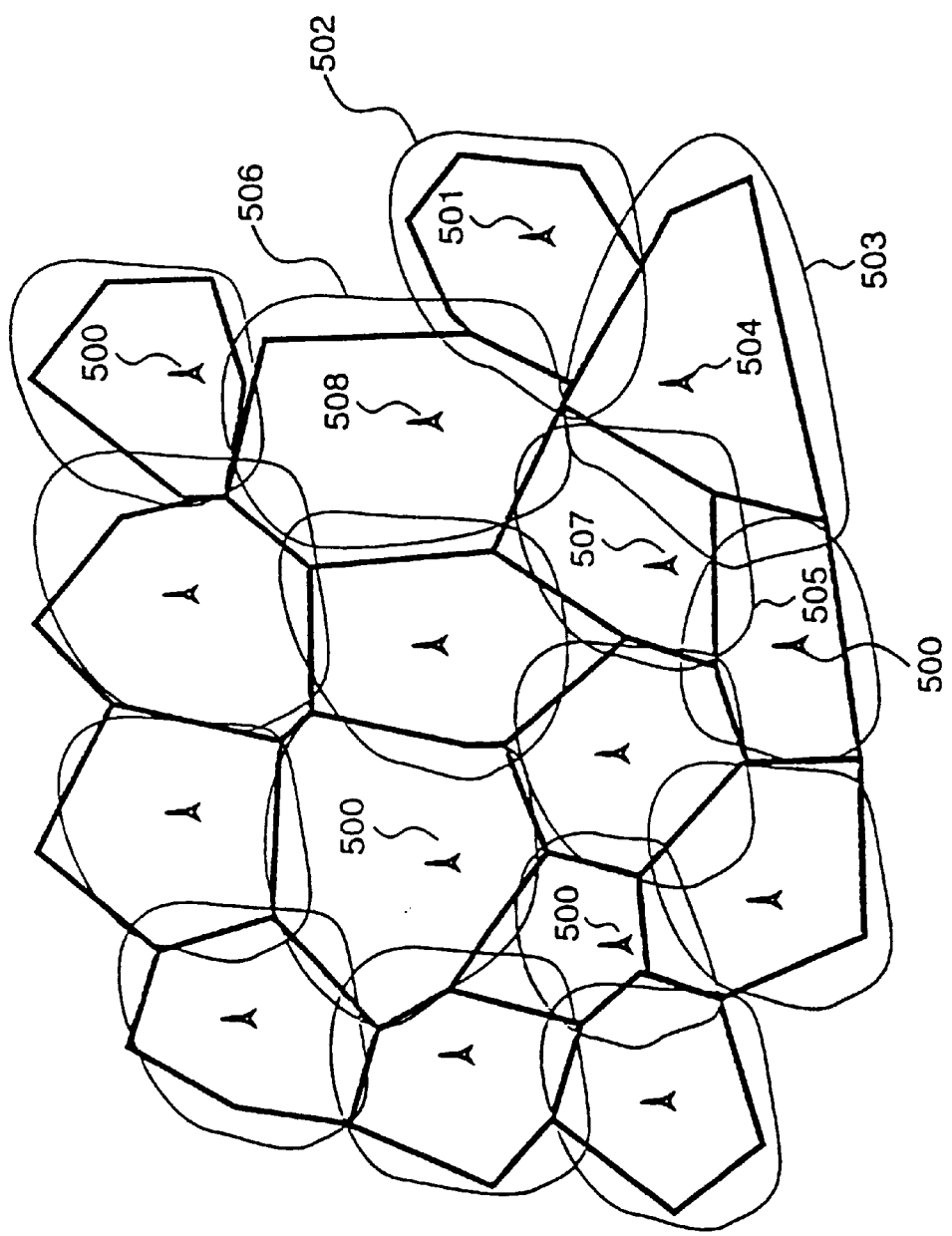
FIG. 5 illustrates typical inconsistant radio coverage for mountainous or undulating areas.
Figure 6:
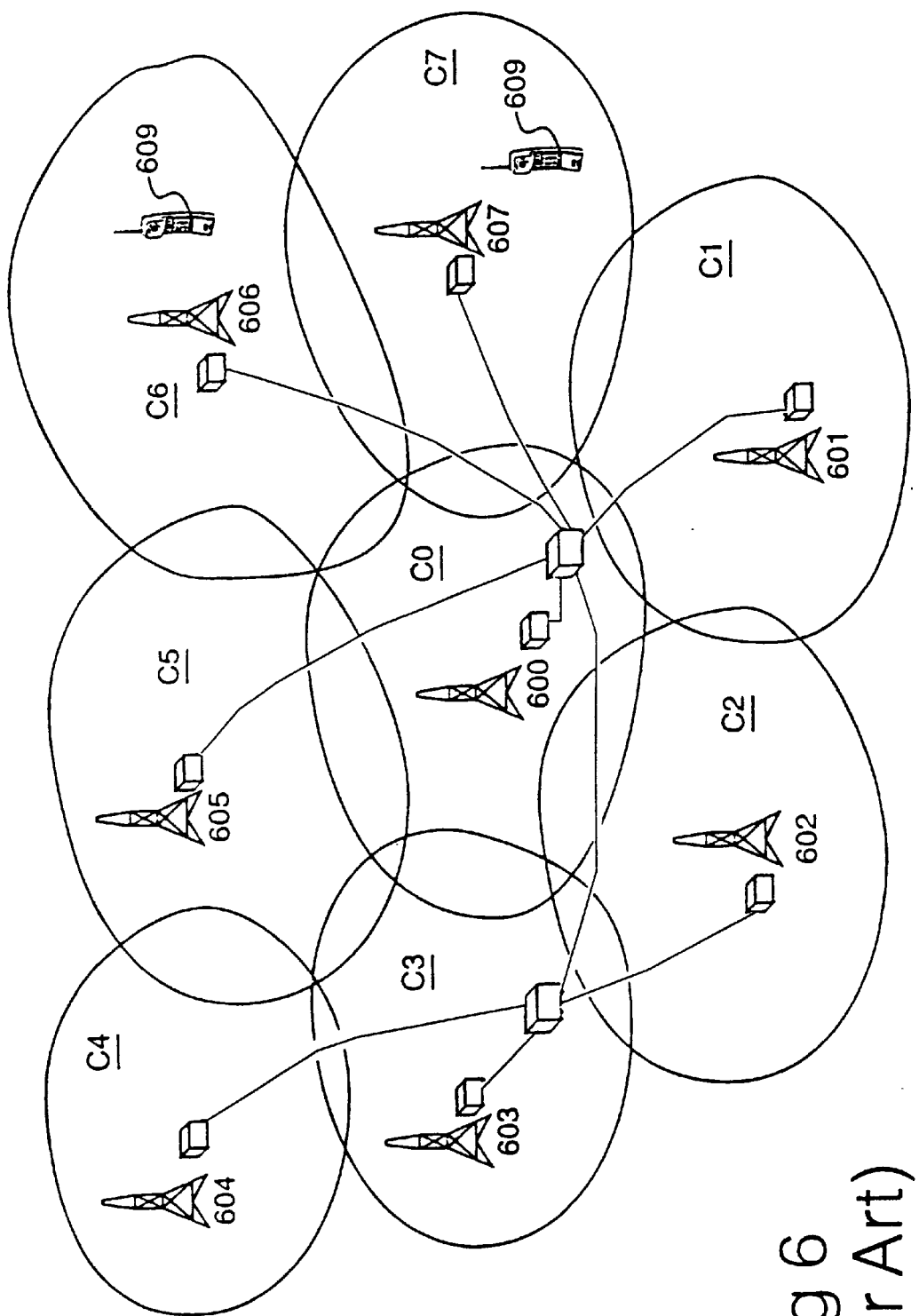
FIG. 6 illustrates a cellular wireless communications network comprising a plurality of transceiver base stations.

In FIG. 18 there is shown an array of number of carrier frequency requirements for each cell C0–C7 in the example 8 cell network of FIG. 6 herein. The anticipated traffic density in the area covered by cell C0 requires the base station 600 to support 11 carrier frequencies. Similarly, the traffic requirements in cell C2 require the base station 602 to support transmission and reception of three carrier frequencies simultaneously.

Referring to FIG. 19, there is shown an arrangement of data in the propagation model data describing the necessary carrier frequency slot spacings between carrier frequencies in the same cell and adjacent cells, in order to avoid intra-cell interference and inter-cell interference between base stations in the network of FIG. 6. The arrangement shown shows an example of data which is formulated in accordance with measurements made under local propagation conditions. Along the diagonal from top left to bottom right in FIG. 19, are the required frequency slot spacings to avoid intra-cell interference. For example in cell C0, represented as the intersection of C0 on the horizontal axis and C0 on the vertical axis, the number 2 represents that there must be a carrier spacing of at least 2 frequency slots between each of the 11 carrier frequencies operated by cell C0, from each other, in order for intra-cell interference to be avoided. The frequency separation in terms in number of frequency slots separation between the adjacent channels in a single cell is determined by local propagation conditions within the cell, and by the ability of the transceiver technology used to distinguish between different frequencies.

Similarly, at the intersection of C2 on the horizontal and C2 on the vertical, the number 3 represents that all three carrier frequencies operated by cell C2 must be separated from each other by at least 3 carrier frequency slots to avoid intra-cell interference. This condition could be satisfied, in the absence of other criteria, by assigning, for example carrier frequency number 1, carrier frequency number 7, and carrier frequency number 13 to cell C2. However, the existence of surrounding cells makes the assignment of carrier frequencies more complex than in this isolated assignment example.

The intersection of cell C1 on the horizontal, and cell C2 on the vertical in FIG. 19 is assigned the number 4, representing that each carrier frequency in cell C1 must be separated by at least 4 carrier frequency slot spacings from each carrier frequency in cell C2 to avoid inter-cell interference between directly adjacent cells C1 and C2. Such inter-cell interference is most likely to occur in the region where cells C1 and C2 come closest or overlap. In practice, this region may expand or contract on a day to day basis depending on atmospheric conditions. The intersection of cell C4 on the horizontal and cell C1 on the vertical shows the number 0, indicating that all carrier frequencies in cell 4 can be reused in cell C1. Referring to FIG. 6, it is seen that cells C1 and C4 are spaced apart from each other by at least two intervening cells comprising C0, C2, C3 and C5. Cells C1 and C4 are spaced so far apart that transmissions in cell C1 are out of range of transmissions in cell C4 and vice versa, and complete carrier frequency reuse is available between cells C1 and C4.

In addition, there are further constraints on the assignment of carrier frequencies determined by other factors which comprise the propagation model data, hardware constraint data or frequency band data. These constraints include the following;

Constraints on the cell size and cell shape around a base station are determined by the propagation characteristics measured in the field Constraints on the placement of base stations are determined by the availability of base station sites and economics of obtaining available base station sites. This information is implicit in the propagation model data.

The propagation characteristics measured in the field may prohibit the use of certain carrier frequencies in certain areas corresponding to certain base station sites.

The measured propagation characteristics may take account of interference of other users of the frequency spectrum, reflections from hills, valleys, water or buildings. Specifications on the positioning of base sites may be included in the propagation model.

The propagation model data, carrier frequency data, and data concerning other constraints, e.g. placement of base sites is input into the operations and management centre apparatus for processing into a frequency assignment plan.

Referring to FIG. 20 herein, there is shown an arrangement of data representing further constraints on the assignment of carrier frequencies to cells C0–C7. The constraints may comprise part of the propagation model data, or part of the frequency band data. For example certain carrier frequency numbers may be disallowed for assignment to certain cells due to local interference, or regulatory constraints. Data is arranged in table form such that the constrained carrier frequency numbers are identified with the corresponding cell numbers. For example, assignment of carrier frequencies numbered 1 to 6 may be disallowed, and this feature is represented by attachment of carrier frequencies 1 to 6 to cell C0 in the tabulated data of FIG. 20.

Referring again to FIGS. 10 to 12, in step 1003, the propagation data, carrier frequency data and other constraint data is processed, resulting in the interference matrix data 1203. The interference matrix data comprises a matrix of empty carrier sites represented as nodes, the nodes being spaced apart from each other by dimensioned links representing frequency slot spacings between carriers. Once a specific carrier frequency number is assigned to each node in the interference matrix, this gives a frequency plan represented by the frequency plan data 1006. Specific carrier frequency numbers in the range 1 to 122 or 127 to 254 in the case of the lower 900 MHz centred band are selected, and are assigned the nodes. The carrier frequencies can be assigned to the nodes in any order, however the order in which assignment is made affects the amount of interference in the final network configured in accordance with the frequency assignment plan. The ordering engine 909 generates the ordering data 1204 specifying the order in which the nodes are selected for assignment of carrier frequencies. The ordering data 1204 is applied to the interference matrix data. Carrier frequencies are assigned to the interference matrix data in the order specified by the ordering data 1204, resulting in the frequency plan data 1006. The frequency plan data is evaluated, resulting in an evaluation data 1205. In the best mode, the evaluation data 1205 is used to modify the ordering data 1204, which is then used to produce a new ordering data. Carrier frequencies are then assigned to the interference matrix data according to the new ordering data to produce a new frequency plan data which is evaluated to produce a new evaluation data, and so on until an optimised frequency plan data emerges.

Generation of the interference matrix data 1203 will now be described. Propagation model data 1202 is input into the operation and management centre apparatus 706 via a disk drive 902, or a communications input/output port 903. The interference matrix generator 908 processes the propagation model data to produce the interference matrix data 1203. The interference matrix is stored in a database device 904 or 905 of the apparatus 706 in the form of a matrix of figures and numbers. How the interference matrix data is determined from the propagation model data by the processor 901 is best understood by graphical representation of data as shown in FIG. 21 herein.

Referring to FIG. 21 herein, there is shown a representation of a small portion of interference matrix data relating to one cell, C2, comprising nodes 2101, 2102, 2103 each node representing a carrier frequency requirement (carrier site) of the base transceiver station at the centre of cell C2. In the example of the FIG. 21, cell C2 requires 3 carrier frequencies which are represented as the three nodes 2101–2103. The nodes are empty, representing that the carrier sites are vacant and require assignment of carrier frequencies. The three nodes are spaced apart form each other by dimensioned links 2104–2106, each link representing a minimum frequency spacing between vacant carrier sites. For example, in the cell C2, from the data table of FIG. 19 it is seen that to avoid intra-cell interference between carrier frequencies a frequency spacing of at least three carrier frequency slots is required. The links 2104–2106 are each dimensioned to a dimension representing three frequency slots. In practice, this means that the carrier frequencies assigned to the vacant carrier sites represented by nodes 2101–2103 must be spaced apart from each other in frequency space by at least three frequency slots, which in the case of a 900 MHz centred band where the carrier frequencies are spaced at regular 200 kHz frequency spacings, would be a minimum frequency spacing of 600 kHz between carrier frequencies assigned to the base transceiver station of cell C2.

Referring to FIG. 22, there is shown an example of one solution of the frequency assignment problem to the cell C2 represented in FIG. 21. In this case, carrier frequencies numbers 1, 6, 11 comprise an allowed assignment of carrier frequencies numbers to the nodes 2101–2103. FIGS. 21 and 22 represent a very simple case of a single base transceiver station having three carrier frequencies. FIG. 22 represents a frequency assignment plan for a single base transceiver station in cell C2, in the absence of any other cells in the network. The dimensions of the links 2104–2106 are determined by the propagation measurements of power and frequency made by field engineers in the geographical area covered by C2 and by the hardware constraints. There exist a multiplicity of other frequency plan solutions which would satisfy the criteria for carrier frequency assignment to cell C2. For example channels 6, 15, 22 are each more than three slot spacings away from each other and would satisfy the constraints represented in the interference matrix of cell C2. Even with a trivially simple case represented in FIGS. 21, 22, there are a large number of possible assignments of carrier frequencies to three carrier vacancy sites on a single base transceiver station, given that there are up to 122 carrier frequencies numbers from which to select 3 carrier frequencies.

Figure 23:
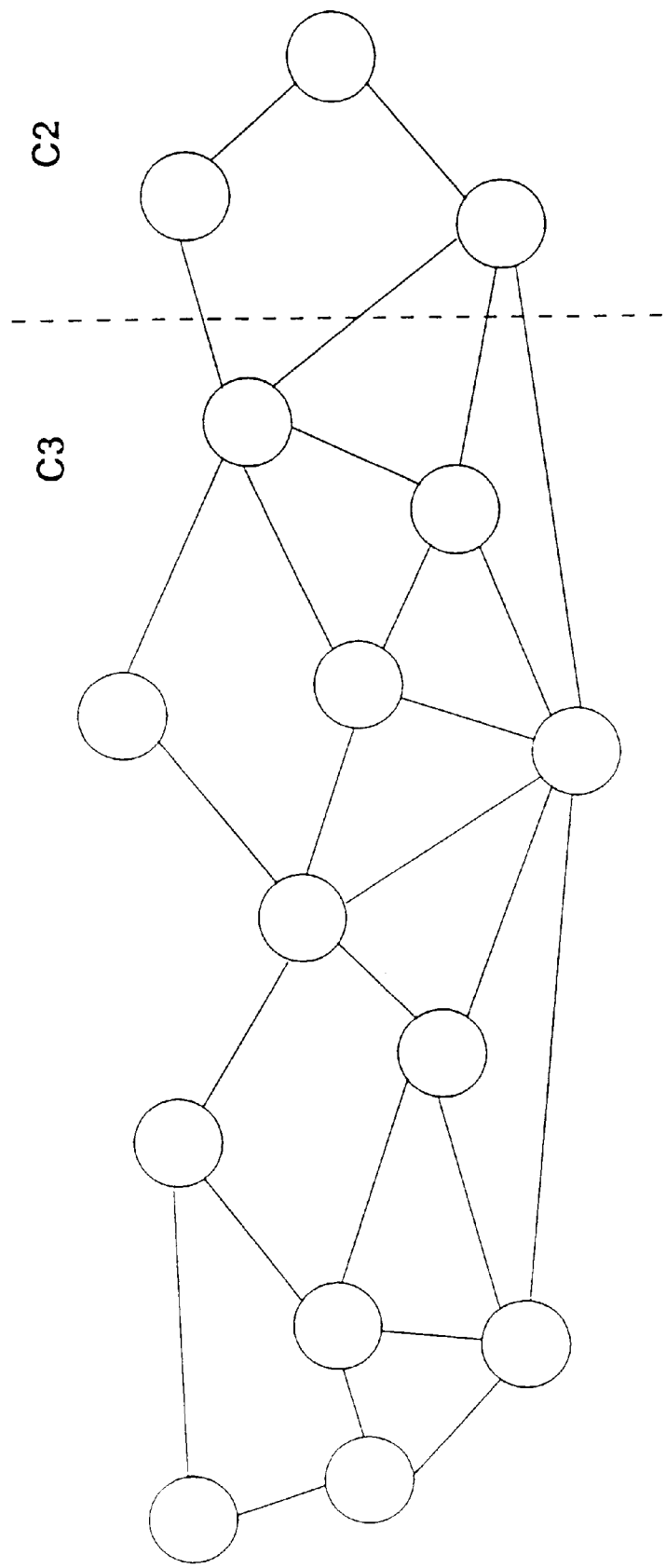

Referring to FIG. 23 herein there is shown a slightly more complex case of a network comprising cells C2 and C3 alone with no other base transceiver stations in the network. An interference matrix for cells C2 and C3 contains 3+12=15 nodes representing three carrier frequency vacancies in cell C2 and twelve carrier frequency vacancies in cell C3. In cell C2 each of the nodes are separated from each other by a link of dimension of at least three frequency slots. In cell C3, to avoid intra-node interference within cell C3, each node is separated from each other node in cell C3 by a link of dimension of at least three frequency slots as indicated on the diagonal intersection of horizontal C3 and vertical C3 in FIG. 19. The full number of links to satisfy this criteria are not drawn in FIG. 23, only a sample of them, as graphical representation soon becomes very complex. FIG. 23 represents only a partial view of the interference matrix of cells C2, C3. In addition to this, each node in cell C3 must be separated from each node in cell C2 by a link of dimension of at least three carrier frequency slots, as indicated by the intersection C3, C2 in FIG. 19, in order to avoid inter-cell interference between carrier frequencies in cell C3 and carrier frequencies in cell C2. FIG. 23 does not show a full set of links for this more complicated interrelationship.

The interference matrix representing cells C2, C3 in isolation, in the absence of other cells but taking into account the constraints for intra-cell interference and inter-cell interference would require dimensioned links between every node and every other node in the combination of nodes of cell C3 and cell C2. For only two cells, carrying a total of 15 carrier frequencies, a full interference matrix comprises 15 nodes and of the order of thousands of links.

A full interference matrix for a network having eight cells as represented by the propagation model data of FIGS. 6 and 18 to 20, would have 11+7+3+12+4+8+12+5=62 nodes, and tens of thousands of links.

The number of dimensioned links in the interference matrix may be reduced by adopting a planar matrix approach which can be drawn in one plane without links crossing over each other, i.e. as shown in FIG. 23, but extending to 62 nodes. However in the best mode described herein a full multi-planar interference matrix is generated by the interference matrix generator.

Figure 24:
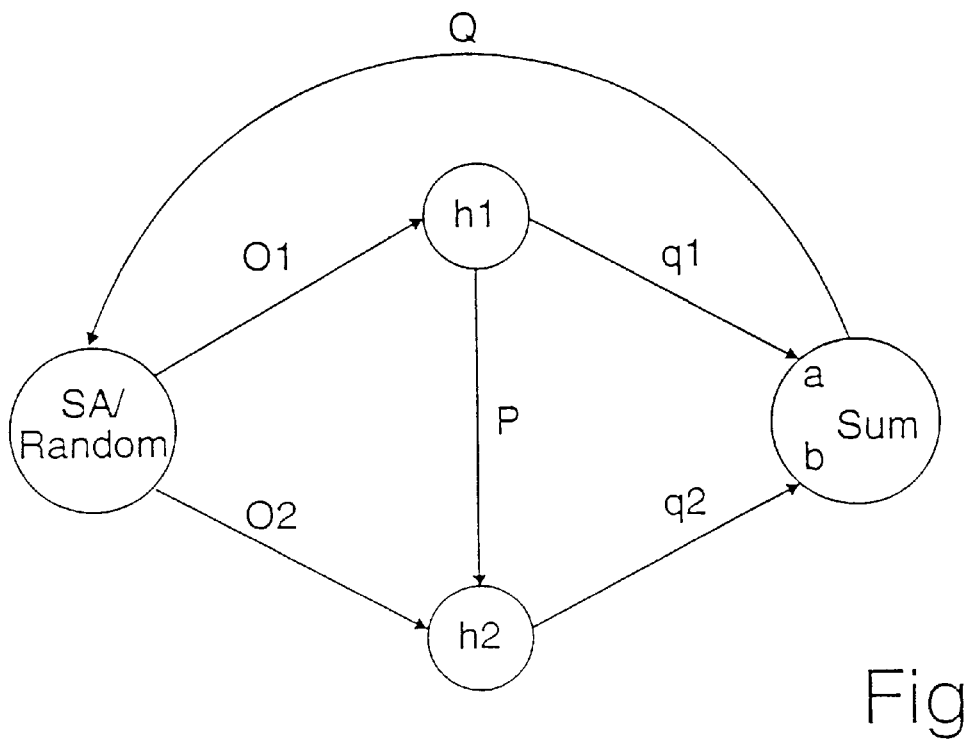
FIG. 24 illustrates and overview of data processing carried out by the operations and management centre apparatus.

Referring to FIG. 24, there is shown schematically an overview of the data processing of steps 1004–1007. Having generated an interference matrix data, a full frequency plan is generated in two stages. In a first stage, a first heuristic assignment algorithm is used to construct a partial frequency plan that is interference free but which may be incomplete. In a second stage a second heuristic assignment algorithm is then used to complete the partial frequency plan in a way which aims to produce minimum interference.

A first stage ordering O1 is generated either randomly, or by a simulated annealing process SA or by a genetic algorithm in the ordering engine 909. The first ordering O1 is input into the first assignment algorithm h1 which produces a partial frequency plan p and a first quality measure data q1 comprising the evaluation data 1205. The partial frequency plan p is input into the second assignment algorithm h2 along with a second ordering O2 generated by the ordering engine 909 in similar manner to the first stage ordering. The second assignment algorithm h2 implemented by the assignment engine 910 produces a complete frequency plan and the evaluation engine generates a second quality measure data q2 and combines the first and second quality measures q1, q2 by summation to give an overall quality data Q. The overall quality data Q is fed back into the ordering engine which generates new orderings depending upon the value of the overall quality measure Q.

Figure 25:
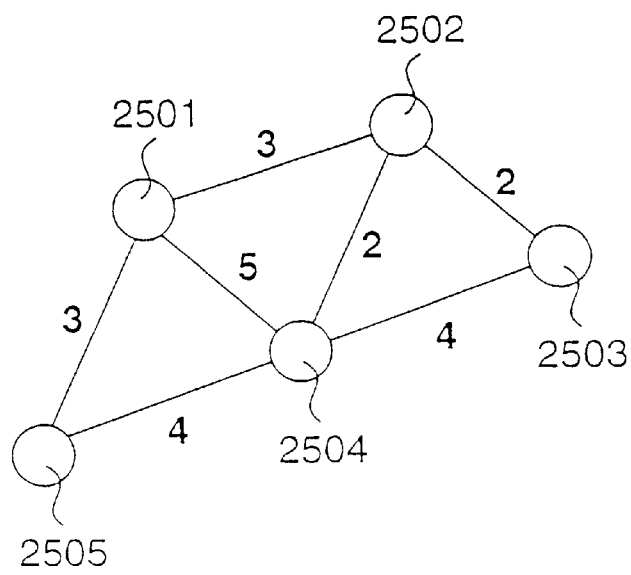
FIGS. 25 to 30 illustrate operation of a first algorithm for assignment of frequencies to base transceiver stations.

Referring to FIG. 25, there is shown a simple example of a network requiring only five carrier frequency numbers represented by five nodes 2501–2505. The dimensions of the links between nodes are illustrated as numbers of frequency slots. The assignment engine 910 controls the processor 901 to assign carrier frequency numbers to the nodes 2501–2505. This is done by a first heuristic assignment algorithm h1 implemented by way of control signal instructions comprising the assignment engine.

The first interference-free assignment algorithm h1 operates as follows. A first ordering data provides an order in which each of the nodes 2401–2405 are considered for frequency assignment. For example, the first ordering data may specify a node order 2505, 2504, 2503, 2501, 2502. Where there are minimal constraints on the set of available carrier frequencies for assignment, the available carrier frequency numbers may comprise all carrier frequencies in a band, for example carrier frequency numbers 2–123, 126–255. On the other hand, various of these carrier frequency numbers may be unavailable. The ordering data specifies the order in which the nodes are considered for assignment of the available carrier frequencies. In the best mode described herein, the carrier frequencies are assigned in order starting with the lowest carrier frequency number. However, in a variation of the process, the ordering data may also stipulate an order in which the carrier frequencies are selected for assignment. For example the ordering data may specify that first of all carrier frequency number 2 is selected for assignment, and the nodes are considered in the order 2505, 2504, 2503, 2501, 2502.

Starting with the lowest available carrier frequency number 2, the first heuristic assignment algorithm h1 proceeds to assign carrier frequency number 2 to node 2505. The first algorithm will then attempt to assign carrier frequency number 2 to the next node specified by the ordering data, 2504. However the dimensioned links connecting cells 2505, 2504, 2501 specify that there must be a minimum frequency spacing of four slots between carrier frequencies numbers assigned to cells 2505 and 2504. Thus, assignment of carrier frequency number 2 is disallowed and the first algorithm goes on to consider the assignment of the next carrier frequency 3 to node 2504. However, the dimensioned link between nodes 2505 and 2504 prohibits the assignment of carrier frequency 3 to node 2504. The first algorithm h1 proceeds to attempt to assign the next lowest carrier frequencies 4, 5, 6 to node 2504 but in each case the dimensioned link prohibits assignment. The next lowest available carrier frequency number 7 is capable of being allocated to node 2504 and is outside the constraints represented by the dimensioned link between nodes 2505 and 2504 having dimension of four carrier frequencies. The first assignment algorithm h1 proceeds to assign carrier frequency 7 to node 2504.

Figure 26:
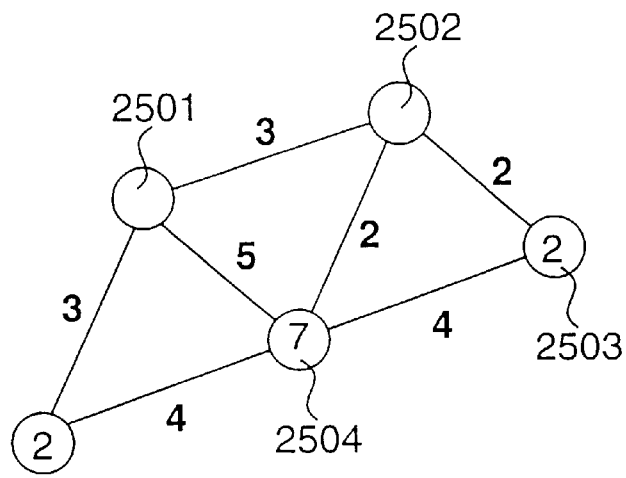

Referring to FIG. 26, the position is shown after assignment of carrier frequencies to the first two nodes in the order 2505, 2504. The first assignment algorithm h1 proceeds to consider the next node in the ordering, node 2503. Node 2503 is separated by a dimensioned link of dimension 4 from node 2504. The first assignment algorithm h1 proceeds to select the lowest available frequency. The lowest available frequency, frequency 2 can be reused in this case, since it is more than four carrier frequencies away from carrier frequency number 7 which occupies node 2504. The first assignment algorithm h1 proceeds to assign carrier frequency 2 to node 2503. The first assignment algorithm h1 proceeds to select the next node specified in the ordering, node 2501. Any carrier frequency assigned to node 2501 must be separated from carrier frequency number 2 assigned to node 2505 by at least three carrier frequencies, and must be separated from carrier frequency number 7 occupying node 2504 by at least five carrier frequencies, these constraints being represented by the dimensioned links between nodes 2505, 2504 and 2501. The first assignment algorithm h1 proceeds to select the lowest available carrier frequency within these constraints, and finds carrier frequency number 13 as being the lowest carrier frequency number which satisfies these criteria. The first assignment algorithm h1 proceeds to assign carrier frequency number 13 to node 2501. The algorithm h1 proceeds to select the next node in the ordering, node 2502 and then proceeds to select the next available carrier frequency. In the case of node 2502, the constraints imposed by dimensioned links between node 2502 and nodes 2501, 2504 and 2503 specify that any carrier frequency assigned to node 2502 must be at least three carrier frequencies away from carrier frequency number 13, must be at least two carrier frequencies away from carrier frequency number 7 and must be at least two carrier frequencies away from carrier frequency number 2. Carrier frequency number 17 is the lowest carrier frequency which satisfies these criteria. The first assignment algorithm h1 assigns carrier frequency number 17 to node 2502. The resultant assignment is described in FIG. 27 herein.

Figure 27:
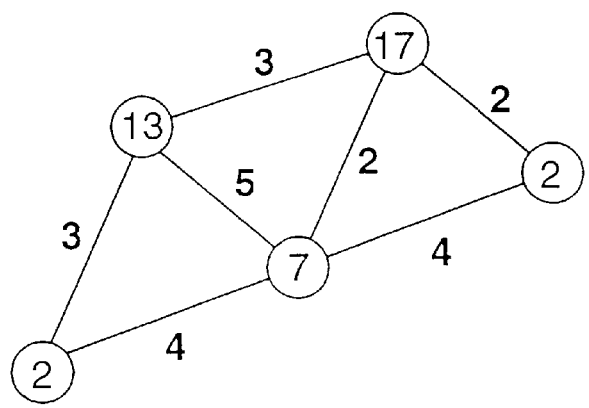

In the simple example above, all nodes had carrier frequencies assigned, since there were enough carrier frequencies spaced far apart enough in frequency to satisfy the traffic demand. Four available carrier frequencies 2, 7, 13, 17 were selected from the band of frequency numbers 2 to 122. The result is shown in FIG.27.

However, in practice, in a real network interference matrix the first assignment algorithm h1 in general will be unable to assign carrier frequencies to all nodes without violating the carrier frequency interference constraints. Thus, the first assignment algorithm h1 assigns carrier frequencies to as many nodes as possible without co-site, first order inter-cell, or second order inter-cell interference.

In general, for a real network, there will remain a number of nodes to which carrier frequencies are left unassigned at the end of the operation of the first assignment algorithm h1. A quality data q1 is generated describing the efficiency of carrier frequency assignment at the end of the first assignment algorithm h1. The quality measure q1 may comprise in a simple case, the number of vacant nodes to which a carrier frequency remains unassigned in the partial frequency plan at the end of the interference free assignment stage.

An implementation of the first assignment heuristic algorithm can be described as follows: A network is defined as a set of n cells, a demand vector, D and an interference matrix, M. Each cell, i has an associated channel demand, $d_i \in D$. A frequency $f_{ik}$, where $1 \leq i \leq n$ and $1 \leq k \leq di$ must be assigned to each channel of each cell in such a way that interference is minimised.

Potential interference is described by the interference matrix, M, where $m_{ij}$ indicates the minimum required frequency separation between a carrier frequency in cell i and a channel in cell j to prevent interference between the carrier frequency. That is $|f_{ik} - f_{jl}| \geq m_{ij}$ for all i, j, k and l $|k \neq l|$.

There is a finite set of available frequencies F, and a set of blocked frequencies B. It is usual to define three different values of frequency separation based upon the radio technology being used to implement the network, a co-site separation, a co-channel separation, and an adjacent channel separation.

The first algorithm assigns frequencies in layers. An attempt is made to assign a single frequency to every cell in a network before any attempt is made to assign an additional frequency to any single cell. This is done to ensure an even assignment of coverage. A core loop of this first algorithm is:

for i=O(1) to O(n) do
  if cell i has an unassigned channel and an interference free channel is available do
    1. Select lowest available frequency and assign to cell
    2. Calculate set of blocked frequencies
    3. Remove blocked frequencies from neighbouring cells.

O represents an ordering, that is a set of n integers.

Figures 28, 29:
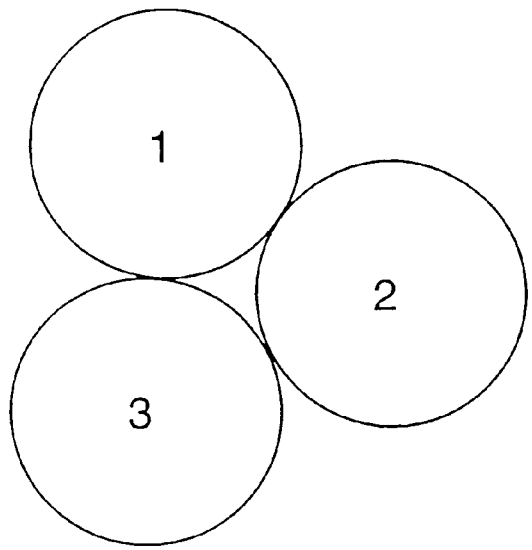
Figure 30:
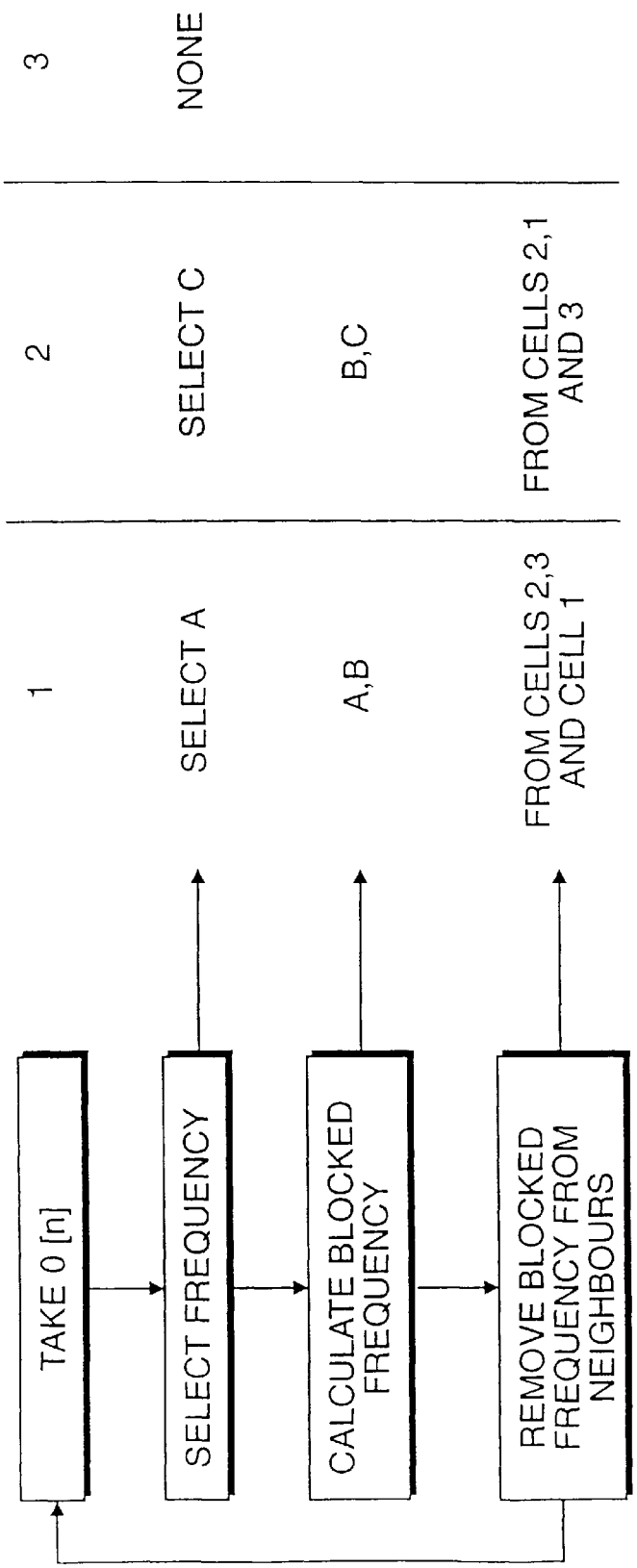

Referring to FIGS. 28 to 30, there is shown an example of frequency selection during the interference free frequency assignment algorithm h1. In FIG. 28, there are three cells 1, 2, 3. In FIG. 29 there is shown an arrangement of data within the assignment engine, and operation of the assignment engine for selecting carrier frequencies. In the left hand column are listed the cell data 1, 2, 3 in the second column are listed available carrier frequencies A, B, C in the third column are listed used carrier frequencies and in the fourth column are listed the carrier frequency demand of the cell. As cells are selected, the assigned frequencies are crossed off the list of available frequencies in the second column, and the frequencies used in the cell are entered into the third, used cell, column.

Referring to FIG. 30 an example of interference free assignment is shown. Taking the first cell a frequency is selected, in this case frequency A on the first row. Applying the rule that adjacent carrier frequency numbers cannot be assigned to adjacent cells, the blocked frequencies for cell 1 and adjacent cells 2, 3 are calculated. In this case the same frequency A and adjacent frequency B are blocked from cells 2, 3. The available frequencies in the table of FIG. 29 corresponding to the cells is updated. The only remaining frequency is frequency C which is assigned to the next cell, cell 2. The table of available frequencies is updated for cells 1, 2, 3 by deleting frequency C leaving no available unblocked frequencies. In the third iteration for cell 3, since all frequencies are blocked, no frequencies can be assigned without causing interference, and further assignment of frequency must await operation of the second heuristic algorithm h2. In this case, after operation of the first assignment algorithm h1, cell 2 still has a vacancy of one carrier frequency and cell 3 has vacancy of one carrier frequency.

Figure 31:
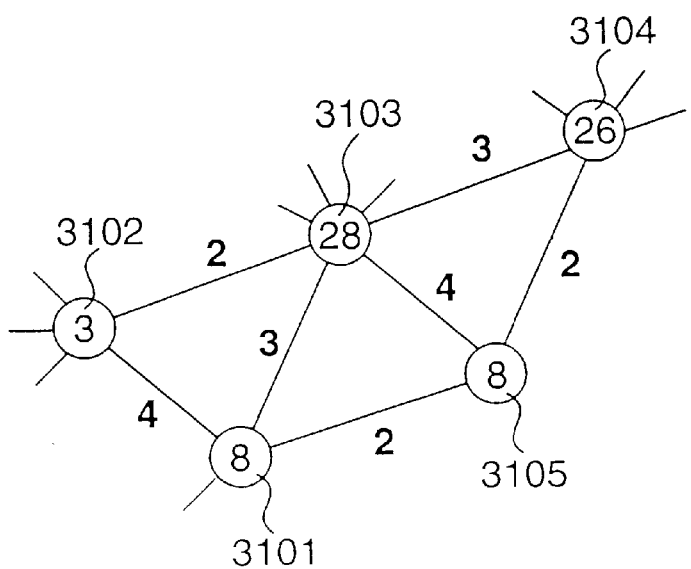
FIG. 31 illustrates an operation of the second algorithm for assignment of frequencies to base transceiver stations.

In the second stage of frequency assignment, it is accepted that in real networks, it is not feasible to assign carrier frequencies to base transceiver stations in a manner which is interference free. At the end of the first stage of carrier frequency assignment, the partial frequency plan data represented by the partially filled interference matrix data is operated on by the assignment engine in accordance with a second heuristic assignment algorithm h2 which assigns carrier frequencies to the unfilled nodes in a way which seeks to minimise the interference between base stations. Referring to FIG. 31, which illustrates a section of an interference matrix unfilled by the first algorithm h1, the second heuristic frequency assignment algorithm h2 operates as follows; Firstly a second ordering data which specifies the order in which the empty nodes 3100, 3101, 3102, 3104, 3105 are to be filled is input into the assignment engine along with the partial frequency plan data resulting at the end of the first assignment stage. The first node is selected in accordance with the second stage ordering data, e.g. the order 3105, 3102, 3104, 3101, and the assignment engine selects a frequency used least in neighbouring cells (i.e. collections of neighbouring nodes) for example a frequency 31 and assigns it to the node 3105. The evaluation engine then records the number of constraints violated by the assignment of that frequency, in this case a violation of two frequency slots connecting with node 3103.

The assignment engine then selects the next node specified in the second stage ordering e.g. node 3102 and selects a carrier frequency used least in the neighbouring cells e.g. 26, and assigns it to the node 3102. Where there is a selection of carrier frequencies used least in the neighbouring cells, the second algorithm h2 may operate to select the lowest carrier frequency of that selection. The number of violated constraints is recorded, in this case one slot.

The second assignment algorithm proceeds to look at each node in turn, in the order specified by the second stage ordering until all nodes have a carrier frequency assigned. Since for each node a record of the number of constraints violated by the assignment of a carrier frequency has been recorded, this data is compiled into a second partial quality measure q2. The first partial quality measure q1 and the second partial quality measure q2 are combined by the evaluation engine to provide an overall quality measure for the complete assignment at the end of the second phase of assignment using the second assignment algorithm. In the best mode, the first and second partial quality measures q1 and q2, are summed to provide an overall quality measure Q. since the quality of measure Q is a sum of unfilled nodes and constraints violated, a lower value of Q represents a better quality of solution.

Completion of the frequency assignment in the second stage operates in accordance with the following core loop of the second heuristic assignment algorithm h2:

for I=O(1) to O(n) do
  while cell i has any unassigned channels do
    1. Select frequency used least in neighbouring cells and assign to cell.
    2. Record number of constraints violated by assignment.

Figure 32:
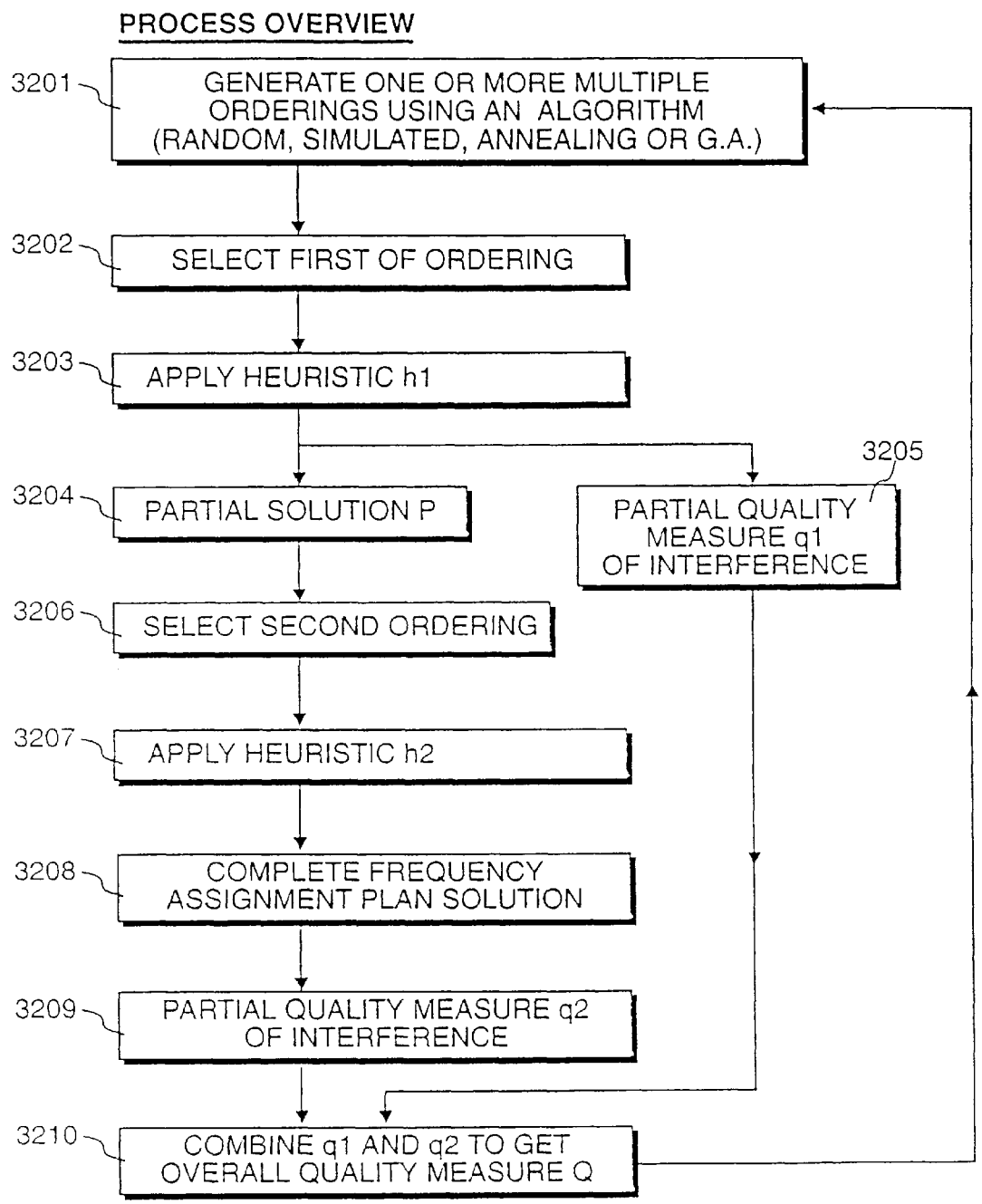
FIG. 32 illustrates an overview of the first and second algorithms for allocation of frequencies to base transceiver stations.

FIG. 32 summarises in overview the main data processing steps for creating a complete frequency assignment plan solution for a network. In step 3201 multiple orderings are generated either randomly, or using a simulated annealing technique or using a genetic algorithm technique. In step 3202 a subset of the orderings, a first ordering O1, is selected and used an input data to the first heuristic assignment algorithm h1 in step 3203. Application of the first algorithm h1 results in a partial frequency plan solution p in step 3204 and a partial quality measure q1 in step 3205. The partial quality measure q1 may be a simple count of how many vacant carrier sites are left at the end of the first assignment algorithm h1. In step 3206, a second ordering, O2, is selected from the multiple orderings. The partial solution p is applied to the second heuristic assignment algorithm h2 with the second ordering, O2, in step 3207 resulting in a complete frequency assignment plan solution in step 3208 and a partial quality measure q2 representing the level of interference in the complete frequency assignment plan solution in step 3209. The first and second quality measures q1, q2 are combined in step 3210 by simple summation to obtain an overall quality measure Q. The quality measure Q is returned to the ordering engine, and the initial orderings are modified by the simulated annealing process and steps 3201–3210 are repeated until an optimized complete frequency assignment plan solution is obtained. For the purposes of obtaining an optimized frequency plan, a simulated annealing algorithm presents the best mode of obtaining an ordering.

Figure 33:
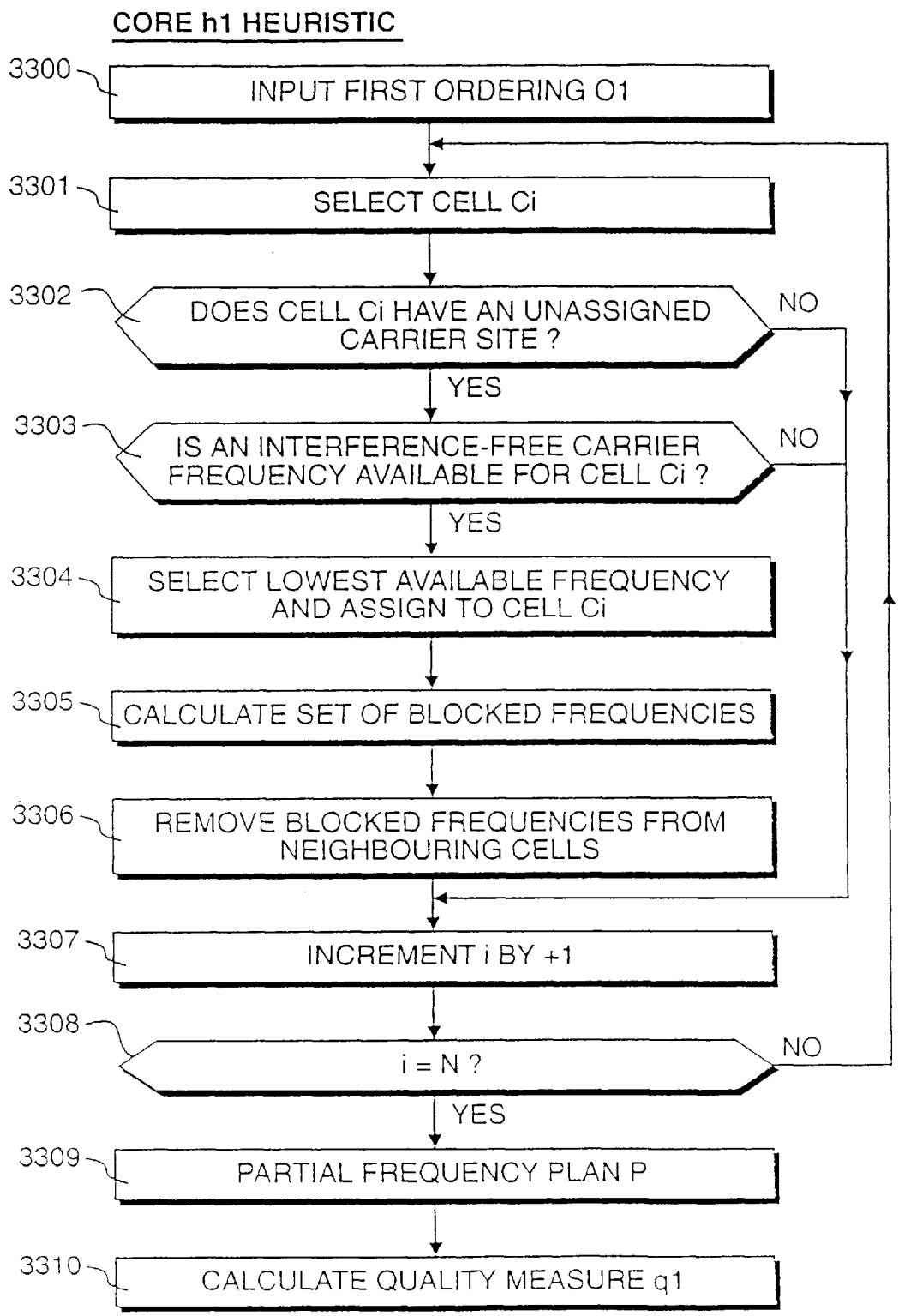
FIG. 33 illustrates a process of frequency allocation implemented by the first algorithm.

Referring to FIG. 33 there is shown the first stage process steps for creating the partial frequency plan p. In step 3300 the first ordering O1 is input into the assignment engine. In step 3301 a first cell $C_i$ is selected, and referring to the interference matrix, in step 3302 the carrier sites (nodes) of cell $C_i$ are checked to see if cell $C_i$ has an unassigned carrier site. If cell $C_i$ does not have an unassigned carrier site in step 3307, 3308 the cell number is incremented and the next cell is selected in step 3301. If this cell $C_i$ does have a vacant carrier site, it is checked which carrier frequencies would be interference free if assigned to cell $C_i$, and the lowest number available carrier frequency is selected and assigned to cell $C_i$ in step 3304. It is then calculated in step 3305 which carrier frequencies are blocked as a result of the assignment and a data list of available carrier frequencies for adjacent and next-but-one neighbouring cells is updated such that the available carrier frequencies for assignment to those adjacent and next-but-one neighbour cells is amended to remove any blocked carrier frequencies. In steps 3307, 3308 the next cell is selected until the algorithm is unable to assign any further carrier frequencies to vacant sites without causing interference. In step 3310 a quality measure q1 of partial frequency plan p is calculate, which may simply be the number of sites assigned with an interference free carrier frequency.

In the process shown in FIG. 33, the algorithm works its way through the interference matrix on a cell by cell basis, attempting to assign a carrier frequencies to a single node in one cell leaving some nodes unassigned, before moving on to the next cell. Operating in this manner may ensure that a uniform allocation of frequencies is made, avoiding hotspots.

Figure 34:
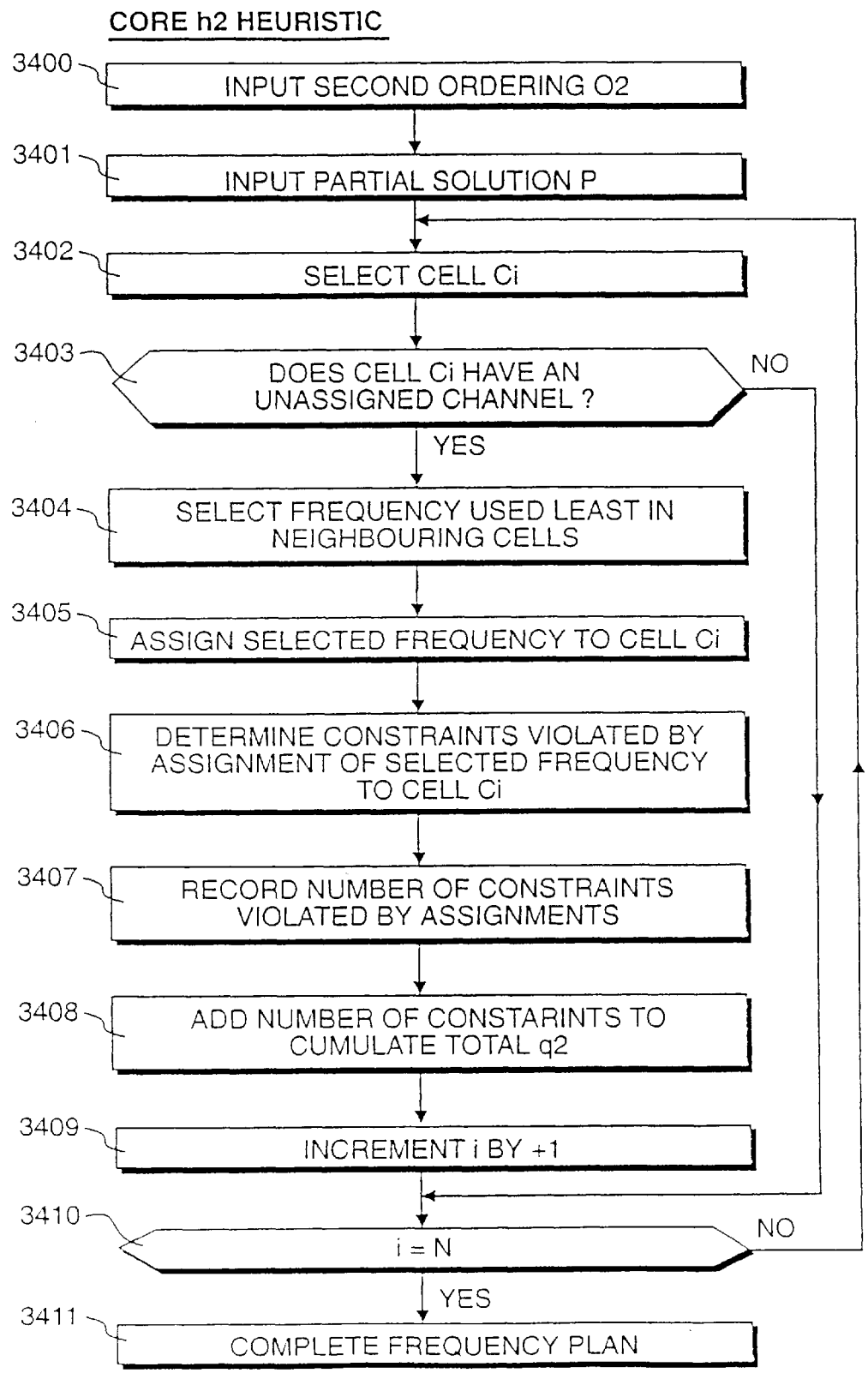
FIG. 34 illustrates a process of frequency allocation implemented by the second algorithm.

Referring to FIG. 34, there is shown a second stage process implemented by the assignment engine for completion of the partial frequency plan, assigning carrier frequencies to vacant carrier sites in a manner which causes a minimum amount of interference. In step 3400 a second stage ordering O2, which is different from the first stage ordering O1 is input into the assignment engine. The partial frequency solution plan p generated at the end of the first interference free assignment stage is input into the assignment engine in step 3401. In step 3402 the first cell specified in the ordering O2, cell $C_i$ is selected. In step 3403 cell $C_i$ is checked to see if there is a vacant carrier site within that cell. If there is not a vacant carrier site within that cell, in steps 3409–3410 the algorithm increments i by one, and returns to step 3402 and selects the next cell $C_i$. If the next cell $C_i$ does have a vacant carrier site, in step 3404 a carrier frequency is selected, being a carrier frequency that is least used in the neighbouring cells, i.e. the adjacent cells and the next-but-one neighbouring cells to cell $C_i$. In step 3405 a selected carrier frequency is assigned to the vacant site in cell $C_i$ and step 3406 it is determined which constraints on the assignment of carrier frequencies are violated by the assignment of the selected carrier frequency to the vacant site in cell $C_i$. For example, assignment of the carrier frequency may violate a co-site interference criteria, a first order inter-cell interference, and/or one or more second order inter-cell interference criteria. The number of co-site constraints, first order and second order constraints violated are recorded in step 3407, and the number of constraints violated are added to a cumulative total of quality measure q2 in step 3408. The algorithm loops back to step 3402 and selects a further cell, and when all cells have carrier sites which are assigned with carrier frequencies, a complete frequency plan results in step 3411.

In the process shown in FIG. 34, the second algorithm works its way through the interference matrix on a cell by cell basis, attempting to assign a carrier frequency to all the nodes in a cell before moving on to the next cell.

As illustrated in FIG. 32, the whole process then repeats by selection of new orderings in the ordering engine. In the best mode, the quality measures q1, q2 are utilised in the selection of the new orderings.

The first and second algorithms may operate to avoid local interference hot spots, through the order in which individual carrier sites in the network are selected. This order is determined by the ordering engine.

By inputting initial orderings generated randomly, cells and nodes are selected randomly over the network, leading to a low probability of beginning the assignment process with local interference hot spots.

By modifying the ordering by a simulated annealing technique local interference hot spots appearing in an initial frequency allocation plan can be broken up and interference can be further distributed, or reduced overall.

In an alternative method, by modifying the orderings using genetic algorithm techniques, local interference hot spots in the frequency assignment plan have a probability of being removed or broken up by de-selection in successive frequency assignment plans.

In the case where the ordering engine generates random orderings, each frequency plan p results in a quality measure q, and the quality measure from the first frequency plan p will have no bearing on the quality measure in a subsequent frequency plan. However, where the ordering engine generates orderings by the simulated annealing technique, the quality measure q can be used to optimize the orderings O1, O2 with the object of improving the quality measure of subsequent frequency plans generated by the annealed orderings.

Simulated annealing as a computational process is patterned after the physical process of annealing, in which physical substances such as metals are melted (i.e. raised to high energy levels) and then gradually cooled until some solid state is reached. The goal of this process is to produce a minimal energy final state in the metal, thus each particle in a mass of particles, in order to settle to its most stable state needs to move when in fluid form, reordering the particles into the most stable state. As the temperature of the metal gradually cools, the energy of the particles gradually reduces and the particles remain in their positions within a metal lattice, unable to move from those positions because their energy is insufficient to jump positions. The rate at which the metal is cooled determines the quality of the final ordering of particles. If the temperature is lowered to quickly, particles do not have enough time to rearrange themselves by individual transitions and hopping from one site to another because there is not enough energy to rearrange. On the other hand, if the temperature is maintained high for a long period, particles which have reached an optimum state retain a high probability of moving out of that optimum state, and no overall improvement in the ordering is reached. Selection of the rate of reduction of temperature plays a critical role in annealing of the material.

In the computational simulated annealing process, the temperature is modelled as a probability of a movement between sites. For example in the case of ordering of cells, each cell will have a probability of exchanging places with another cell, i.e. hopping positions in order. As time progresses, the probability of hopping positions is reduced (comparable to reducing the temperature in the physical process) and the rate of reduction of probability with time, termed the annealing schedule, determines the efficiency of the annealing process in optimizing the ordering.

In the general process for generating the frequency assignment plan, simulated annealing may allow a gradual change of ordering, resulting in the search for an optimised frequency plan. The annealing schedule in the simulated annealing process is determined from the quality measure Q produced from the final frequency plan p. Where successive frequency plan data have dissimilar evaluation data and quality measures $q1$, $q2$, $Q$, then the annealing schedule may be reduced by having probabilities of changes in the order so that frequency plan solutions can converge to a more stable state. If, after only a few frequency plan solutions, there is strong convergence towards a particular quality measure value, then the annealing schedule may be altered to give a higher probability of transitions of cell order in the early iterations.

Although simulated annealing is described in the best mode herein, the simulated annealing process may be replaced by a genetic algorithm process as described in Goldberg[14]. Where the genetic algorithm technique is used, an initial population of orderings are generated as a set of one dimensional strings of cell numbers, and the strings are then mutated and evolved until an optimized ordering appears. The criteria for selection of the optimum strings of cell orderings from generation to generation are the quality measures $q1$, $q2$, $Q$ determined from the frequency plan p. Cell ordering strings which result in frequency plans having higher quality measures stand a higher probability of being evolved and retained in the next generation of strings than strings which give rise to frequency plans having lower values of Q.

An alternative quality measure Q may be calculated as a simple sum of the number of dimensioned links violated after operation of the second algorithm h2. Although this technique is more computationally expensive than the generation of quality measures $q1$, $q2$ as described hereinbefore, it has been found that the simulated annealing algorithm gives improved performance when this alternative measure of quality is sought to be minimised. There is a trade-off between computational complexity and quality of solution, depending on the type of quality measure used.

By moving in to a different cell every time a frequency is assigned to a node, uniformity of interference in the final frequency plan may be achieved, and local interference hot spots may be avoided. Further, by selecting different first orderings and second orderings in the first and second stages, the search space for the final frequency plan solution may be kept wide throughout the frequency assignment process. Further, for each selected frequency a new ordering for selection of cells may be used.

The above described random ordering process, simulated annealing ordering generator process or genetic algorithm generated ordering process are presented as alternatives in the overall frequency plan generation, process described herein, and the simulated annealing technique is described in the best mode.

Experimental Results

Experiments were carried out in order to investigate the effect of using orderings generated by different techniques. Orderings were generated by a simulated annealing algorithm, and orderings were generated randomly and the results compared. Also investigated were the effects of using a single ordering for both assignment stages, compared with using different orderings for the first and second assignment stages (respective first and second orderings).

Referring to FIGS. 35 to 38 herein, experiments reported here consisted of one hundred runs of each algorithm variant, where each run was terminated after 5 minutes of computation on a Hewlett Packard 9000 workstation. The simulated annealing algorithm used a geometric cooling schedule, with a cooling rate of 0.90. Cells in the ordering were subjected to simple swaps of position, and movements of position as neighbourhood operators in the simulated annealing process. Experimental results are presented in FIGS. 35 to 38 as distributions of solution qualities. Solution quality is shown on the horizontal axis, whilst the number of trials that achieved this quality is shown as a vertical line.

The algorithms were evaluated on real network design including real propagation model data. The network investigated had eighteen base stations and was a mixture of omnidirectional and tri-sectored antennae giving a total of 48 cells with a total demand for 107 carrier frequencies. There are twenty seven frequencies available for use within the network. The co-site separation is two frequency numbers, and the co-channel and adjacent channel separations are one frequency number. Solution quality scaling factors a and b are set to unity and two hundred, respectively.

Seven variants of the algorithm described within were evaluated as follows:

1. a single random ordering used by both the first and second heuristic algorithms h1, h2,
2. a separate random ordering for each algorithm h1, h2,
3. a single simulated annealing generated ordering used by both the first and second heuristics h1, h2,
4. a separate simulated annealing ordering used respectively for each heuristic h1, h2,
5. a single simulated annealing generated ordering for the first heuristic h1, and a single randomly generated ordering for the second heuristic h2,
6. a single randomly generated ordering for the first heuristic h1, and a single simulated annealing generated ordering for the second heuristic h2,
7. multiple simulated annealing generated orderings for the first heuristic h1 and a single simulated annealing generated ordering for the second heuristic h2.

The first two experiments evaluated the effect of using a different ordering for each heuristic algorithm h1, h2. Two trials were carried out, a trial with algorithm variant 1, and a trail with algorithm variant 2.

Figure 35:
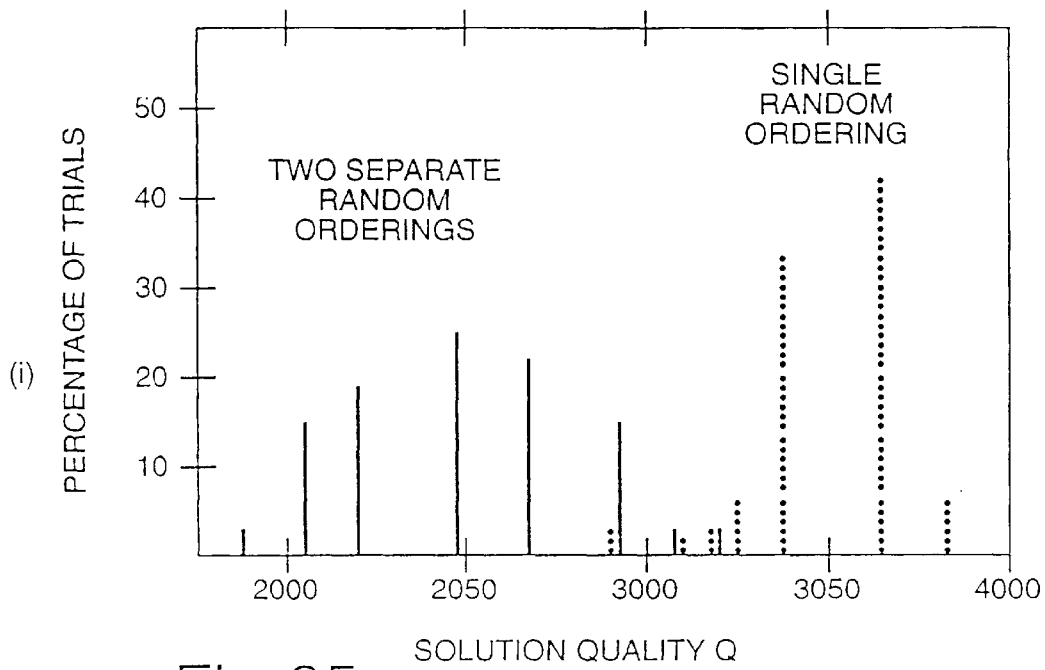
FIGS. 35 to 38 illustrate experimental results relating to a quality of result of frequency assignment plans for assignment of frequencies to a communications network.

FIG. 35 indicates that using a different randomly generated ordering for each heuristic improves the performance, compared to using a single randomly generated ordering.

Figure 36:
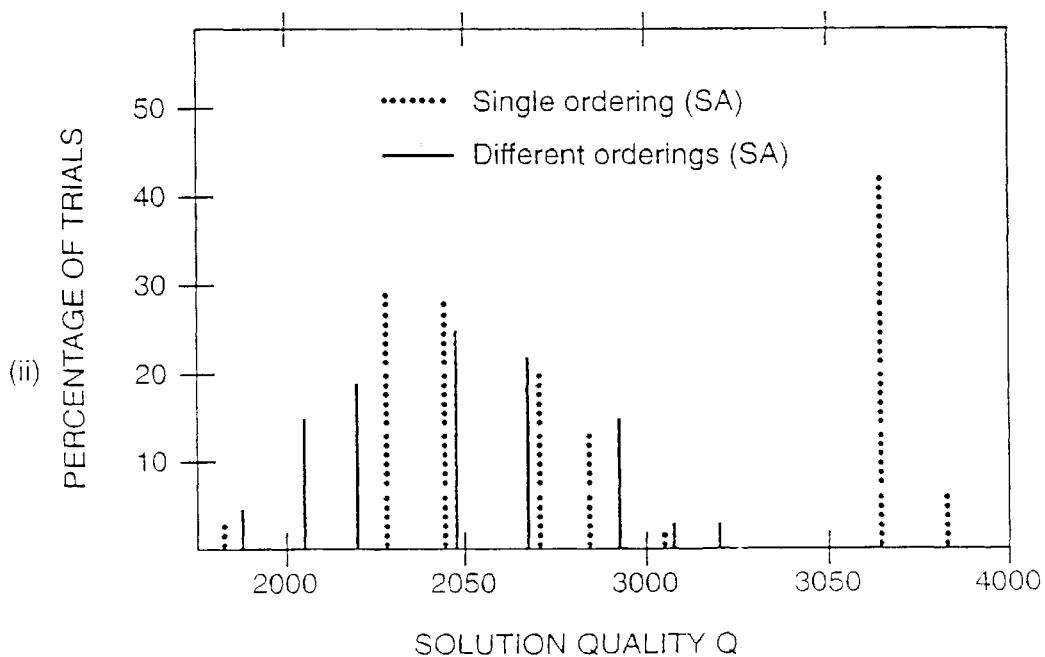

However, for the equivalent simulated annealing trials, that is trials with algorithm variants 3 and 4, indicates that simulated annealing can discover a single ordering that performs as well as two different orderings, as shown by the distributions of FIG. 36.

The fitness distribution of variant 2, that is the leftmost distribution in FIG. 35 may be used as a baseline distribution against which other results can be compared. Comparing FIG. 35 with FIG. 36 it is apparent that although simulated annealing can discover a single ordering that performs as well as two different ordering, there is no significant performance difference between using a single or two different simulated annealing ordering or two different random orderings.

Figure 37:
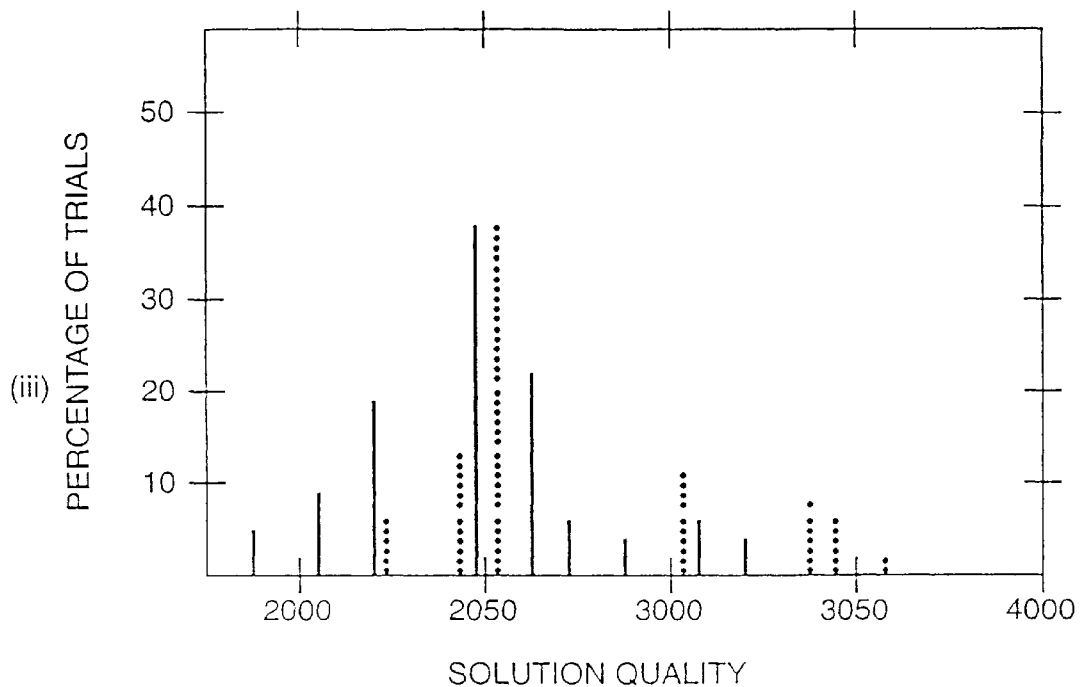

FIG. 37 shows results of experiments with algorithm variants 6 and 5. There is still no significant difference between these variants and the baseline distribution of two separate random orderings in FIG. 35.

Figure 38:
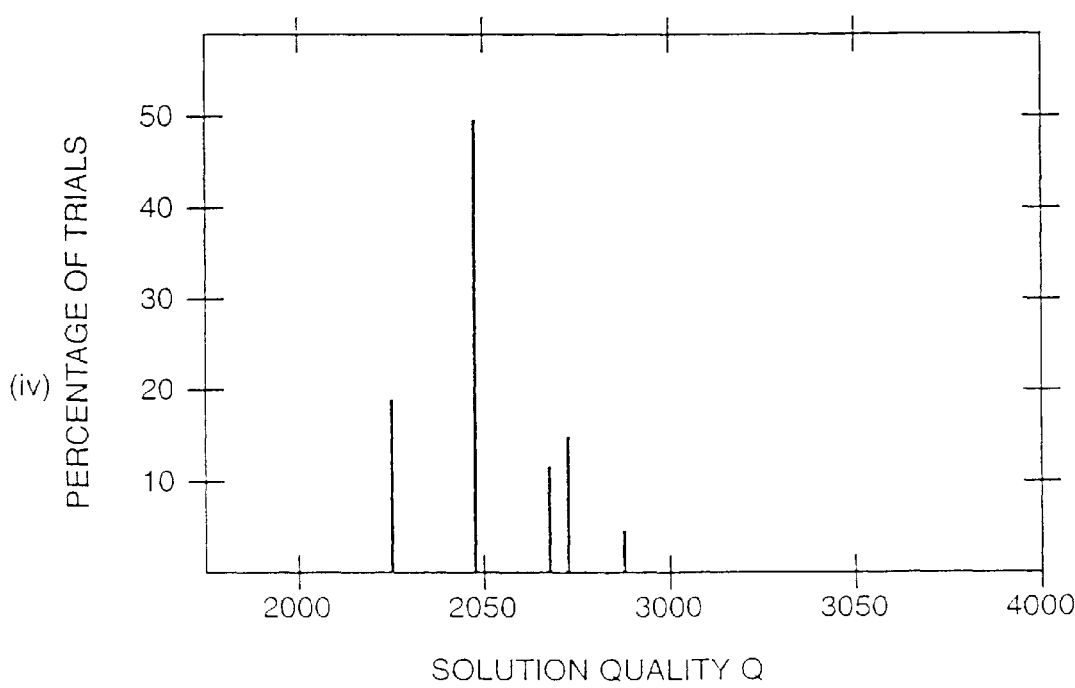

The layered nature of the assignment heuristic used in the first algorithmic phase is capable of using multiple orderings, that is one ordering for each layer of frequencies assigned by the heuristic. FIG. 38 shows results for using multiple orderings, generated by simulated annealing, within the first heuristic, that is algorithm variant 7. Once again there is no significant difference between this distribution and the baseline distribution of FIG. 35.

Simulated annealing is able to create a single ordering that can perform as well as multiple orderings.

Figure 39:
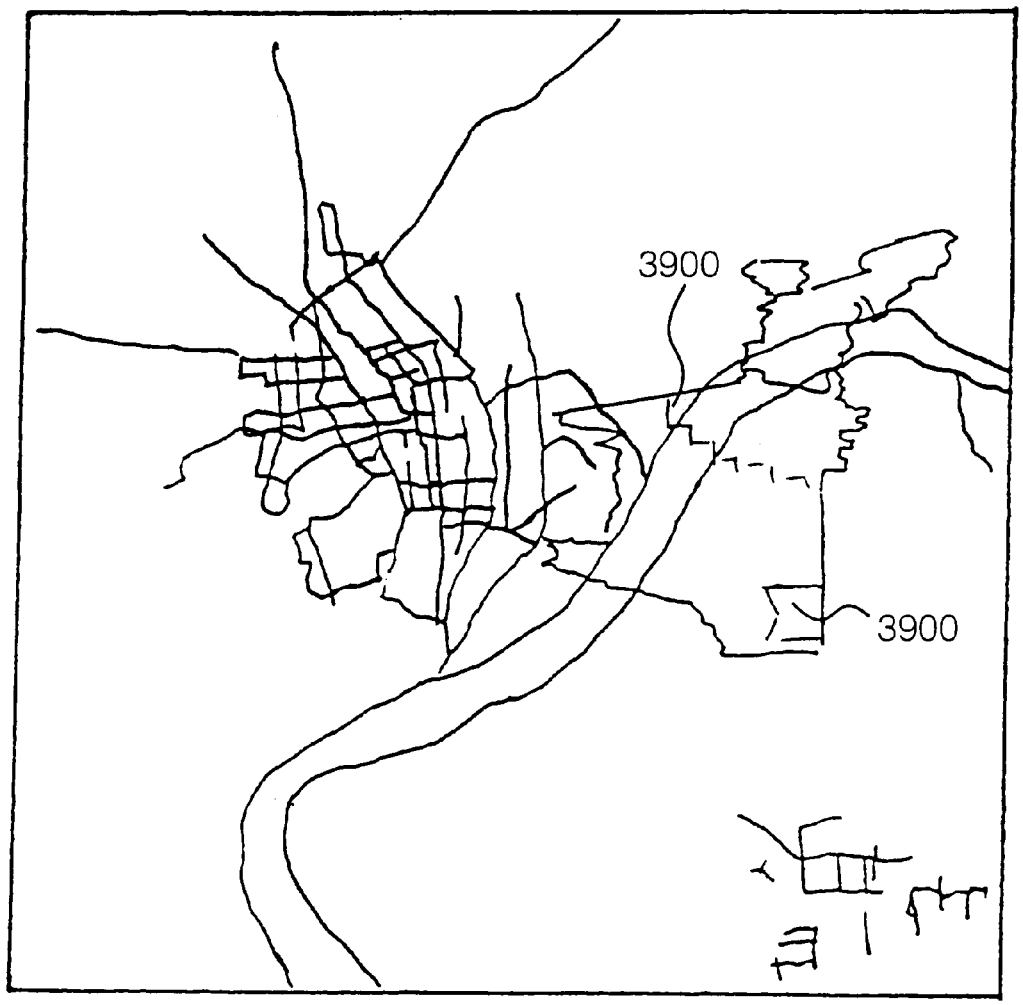
FIG. 39 illustrates a result of radio interference in a frequency assignment plan for communications network.

Referring to FIG. 39, there is shown a graphical representation of a frequency plan data as displayed on the workstation monitor for a network covering a small city. The gridlines in FIG. 39 represent streets of a city, and the cloud 3900 represents areas of interference, with the shading representing levels of interference within those areas for a network designed in accordance with the frequency plan generated by the process of the best mode described herein. In this case, the network comprises eighteen antennae base stations. The result of FIG. 36 was computed on Hewlett Packard HP9000 workstation in five minutes, and provides a total coverage of 98.8% of the required coverage area, with a mean channel interference across the region of 37 dB.

Figure 40:
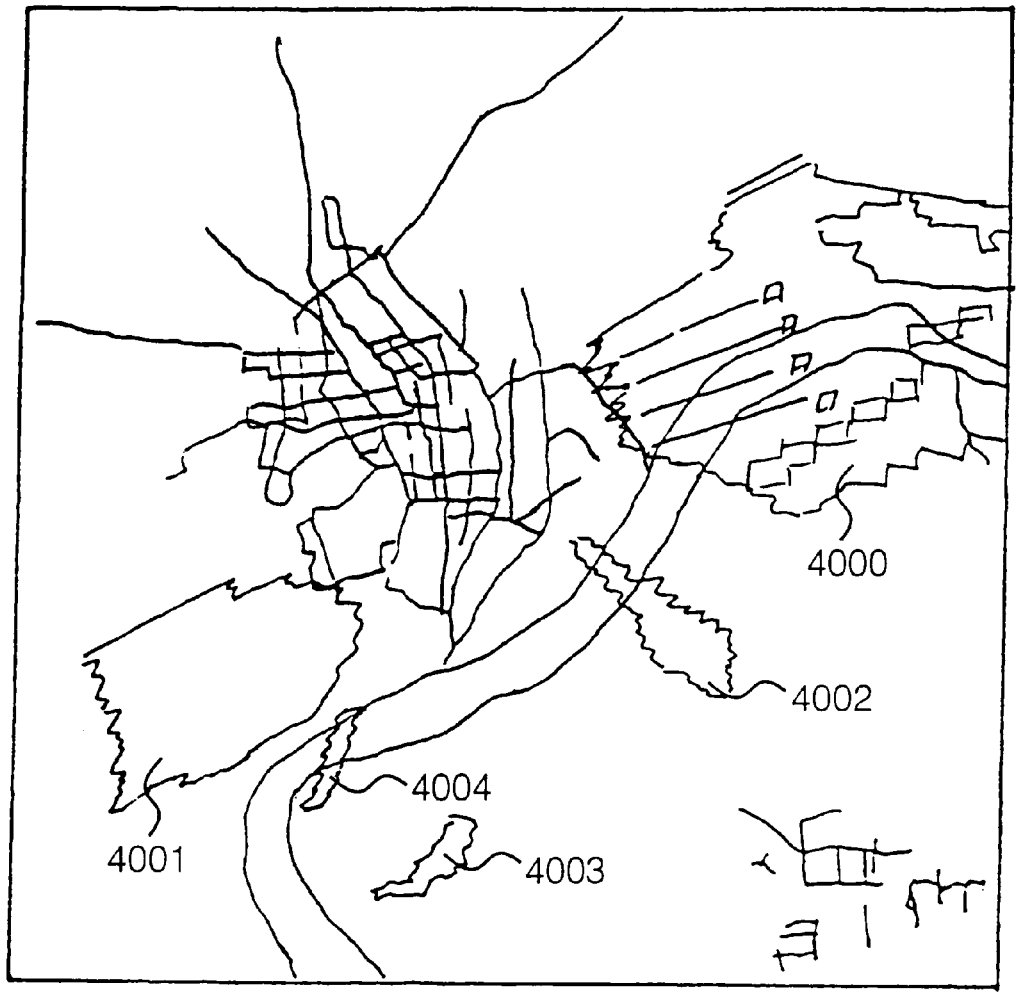
FIG. 40 illustrates an interference produced in a prior art frequency assignment plan for a communications network.

Referring to FIG. 40 herein, there is shown for comparison a frequency plan generated by a prior art method using the same input data of eighteen antenna, and the same propagation data and hardware constraint data. Areas of interference 4000–4004 in the prior art frequency plan are more extensive. The frequency plan represented in FIG. 40 took two days of computation to produce, had a mean channel interference level of 24 dB, and a total coverage of 93% of the required area.

The prior art frequency plan of FIG. 40 was produced by an Ericsson algorithm by the company Mobile Systems international in Paris. However, the know Ericsson algorithm does not generate a complete frequency plan, just a best attempt leaving some carrier sites unassigned. It is then the network designers job to fill in any vacant carrier sites intuitively, with the object of causing the minimum amount of interference.

Other prior art simulated annealing solutions, which attempt to anneal a full frequency plan report computation times in the range ten minutes to ten hours, with variable quality of result.

Figure 42:
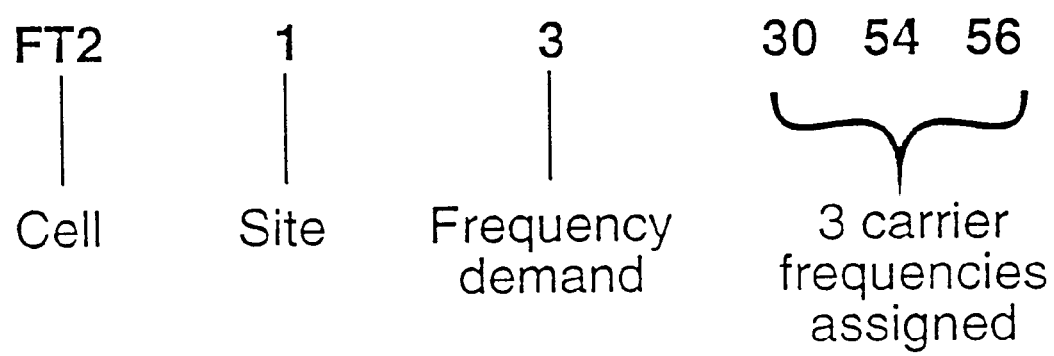
FIG. 42 illustrates a layout of data in the frequency assignment plan of FIG. 41.

Referring to FIGS. 41*a* to 41*c* herein, there is shown an example printout of frequency plan data produced in according to the method of the best mode herein. The frequency plan relates to a network having ninety antenna and 270 sectors, and computes according to the present best mode methods in around fifty minutes on a Hewlett Packard HP 9000 workstation, illustrating that a relatively large network can be reconfigured in a relatively short time scale using the process, methods and apparatus described in the best mode herein. The data lists the cells FT2, FT3 etc. along with a sector label in the second column in the corresponding frequency demand in term of number of carrier frequencies required for that sector in the third column. The corresponding carrier frequencies numbers are listed to the right hand side of the frequency demand. The lay out of the frequency plan data is described in FIG. 42.

Whilst the best mode anticipated by the inventors and described herein operates in the Global System for Mobile Communications (GSM), the underlying processes, methods and apparatus are more generally applicable to other systems for wireless communication, such as the known northern european Nordic Mobile Telephony (NMT) system or the known TACS system and the invention claimed herein encompasses such systems.

What is claimed is:

1. A method for assigning a set of communications frequencies to a plurality of network elements, each operating at least one frequency, the method comprising the steps of:

representing each said network element as a corresponding respective set of at least one frequency site node;

linking said plurality of frequency site nodes together by a plurality of dimensioned links, each said dimensioned link representing a constraint on the assignment of a communications frequency to at least one said node;

determining at least one order in which to assign said plurality of communications frequencies to said plurality of nodes;

for each node of the plurality, where possible assigning a frequency which does not interfere with frequencies assigned to other said nodes; and for each node for which a non interfering frequency cannot be assigned, assigning to said node a frequency which causes a minimum interference with frequencies assigned to other said nodes, wherein during said step of assigning a non-interfering frequency said nodes are selected in a first order and said frequencies are assigned to said nodes taken in said first order, and during said step of assigning a minimally interfering frequency, said nodes are selected in a second order and said frequencies are assigned to said nodes taken in said second order.

2. The method as claimed in claim 1, wherein said step of assigning a frequency which does not interfere with frequencies assigned to other nodes comprises;

assigning said frequency according to a first assignment algorithm which assigns said frequencies to as many nodes as possible without co-site first order inter cell, or second order inter cell interference.

3. The method as claimed in claim 1, wherein said step of assigning a frequency which does not interfere with frequencies assigned to other nodes comprises;

assigning said frequencies according to first assignment algorithm which assigns frequencies in layers, in which an attempt is made to assign a single frequency to every cell in a network before an attempt is made to assign an additional frequency to any single cell.

4. The method as claimed in claim 1, further comprising the step of:

producing a quality measure representing a quality of said substantially interference-free assignment, said quality measure comprising a number of vacant nodes to which a carrier frequency remains unassigned in a partial frequency plan produced at an end of said step of assigning a frequency which does not interfere with frequencies assigned to other nodes.

5. The method as claimed in claim 1, wherein said step of assigning frequencies in a minimally interfering way comprises;

selecting a node according to said second order;

selecting a frequency which is minimally interfering with frequencies assigned to other nodes linked in said selected node; and assigning said selected minimally interfering frequency to said node selected according to said second order.

6. The method as claimed in claim 1, further comprising the step of;

evaluating a result of said assignment of a minimally interfering frequency to said selected node; and producing a quality measure determined from a level of interference produced by said assignment of said minimally interfering frequency.

7. A method according to claim 1, wherein a said step of assigning comprises:

maintaining a table of node data and frequency data in which each said node has listed a corresponding set of available frequencies and a corresponding set of linked nodes;

selecting a node in accordance with said order;

revising said table on assignment of a said frequency to a selected node by deleting said assigned frequency from said set of available frequencies corresponding to said selected node; and deleting said assigned frequency from said sets of available frequencies corresponding to other nodes of the plurality each of which are linked to the selected node.

8. The method as claimed in claim 1, wherein said step of determining an order comprises modifying said order in response to a quality measure determined as a result of said assignment of frequencies.

9. A method for assigning a plurality of communications frequencies to a communications network comprising a plurality of network elements, the method comprising of steps of;

representing said communications network as a matrix of a plurality of node data and a plurality of dimensioned link data in which each said network element is represented by a corresponding respective set of said node data, and said dimensioned link data represents a set of constraints on the assignment of communications frequencies to said plurality of node data;

representing said set of communications frequencies as a set of frequency data;

determining an order data representing a first and a second order in which to assign said set of frequencies to said nodes;

assigning said frequency data representing said set of frequencies to said node data representing said nodes in said first order, in an interference free manner across said whole matrix until no more interference free assignments can be made;

assigning said frequency data to said node data representing any remaining vacant nodes according to said second order, in a way which causes minimum interference; and generating a quality measure data of said assignment of frequencies to nodes, wherein said step of determining an order data representing a first and second order comprises modifying said order data according to said generated quality measure data of said assignment of frequencies to said nodes.

10. The method as claimed in claim 9, wherein said step of determining an order data representing an order comprises applying a simulated annealing algorithm to generate an order of node data.

11. The method as claimed in claim 9, wherein said step of determining an order data comprises generating an order of node data by a genetic algorithm.

12. The method as described in claim 9, wherein said step of determining an order data comprises generating a random order of node data.

13. A data processing apparatus for processing data describing a plurality of communications frequencies and data describing a plurality of network elements comprising a communications network, the apparatus comprising a processor and a memory configured into the following elements:

an interference matrix data generating means for generating an interference matrix data in which each said network element is represented by a corresponding respective plurality of nodes each representing a frequency site, said nodes being linked by a plurality of links, each said ink representing a dimensioned constraint on an assignment of at least one frequency to at least one said node;

an order data generating means for generating an order data specifying a first order and a second order in which to select said nodes for assignment of said frequencies;

a frequency assignment data generating means for generating a frequency assignment plan data specifying an assignment of frequencies to said nodes; and an evaluation data generating means for evaluating said assignment plan data and producing an evaluation data describing a quality of said assignment plan data, wherein said order data generating means operates to receive said evaluation data and create a new order data selection of said nodes, in response to said evaluation data;

wherein said frequency assignment data generating means generates a new assignment plan data in response to said new order data, by assigning said nodes to said nodes in a manner in which each frequency assigned does not interfere with frequencies assigned to other said nodes, said first assignment selecting said nodes in a first said order, and in a second assignment, assigning said frequencies to each node for which a non-interfering frequency cannot be assigned, in a manner which causes a minimum interference with existing frequencies assigned to other said nodes, and in said second assignment selecting said nodes according to said second order.

14. The apparatus as claimed in claim 13, wherein said new order data comprises a modification of said order data.

15. An apparatus for assigning a plurality of frequencies to a plurality of network elements comprising a communications network, said apparatus comprising:

an interference matrix generation means for generating an interference matrix in which each said network element is represented by a corresponding respective plurality of nodes, each said node representing a carrier site, said nodes being linked by a plurality of links, each said link representing a dimensioned constraint on an assignment of at least one frequency to at least one said node;

an ordering means for determining a first order and a second order in which to assign said frequencies to said network elements;

an assignment means for assigning said plurality of frequencies to said plurality of network elements in an order specified by said ordering means;

an evaluation means for evaluating a result of said assignment of frequencies and for generating an evaluation data signal in accordance with said result, wherein in said step of assignment, said assignment means operates to assign frequencies to said set of nodes in a manner in which each frequency assigned does not interfere with frequencies assigned to other said nodes, said first assignment made to said nodes selected according to a first said order, and for each remaining node for which a non-interfering frequency cannot be assigned, making a second assignment in which a said frequency is selected which causes a minimum interference with frequencies assigned to other said nodes, said second assignment of frequencies carried out selecting said nodes according to a second said order.

16. A machine readable medium containing control signals for causing a data processing apparatus to function as an apparatus for assigning a plurality of frequencies to a plurality of nodes representing network elements comprising a communications network, said control signals configuring said data processing apparat us into the following elements:

an interference matrix generation engine for generating an interference matrix data in which each said network element is represented by a corresponding respective plurality of nodes each representing a frequency site, said nodes being linked by a plurality of links, each said link representing a dimensioned constraint on an assignment of at least one frequency to at least one said node;

an order generating engine for generating an order data specifying a plurality of orderings in which to select said nodes for assignment of said frequencies;

a frequency assignment engine for assigning frequency data describing an assignment of said frequencies to said nodes; and an evaluation engine for evaluating a result of said assignment of frequencies to nodes, and for producing a quality data in response to said evaluation, wherein in said step of assignment, said assignment means operates to assign frequencies to said set of nodes in a manner in which each frequency assigned does not interfere with frequencies assigned to other said nodes, said first assignment made to said nodes selected according to a first order, and for each remaining node for which a non-interfering frequency cannot be assigned, making a second assignment in which a said frequency is selected which causes a minimum interference with frequencies assigned to other said nodes, said second assignment of frequencies carried out by selecting said nodes according to a second order.

17. The method as claimed in claim 16, wherein each said dimensioned link represents a frequency slot spacing between at least a pair of carrier frequencies.

* * * * *